US011100729B2

(12) United States Patent
Tojima et al.

(10) Patent No.: US 11,100,729 B2
(45) Date of Patent: Aug. 24, 2021

(54) INFORMATION PROCESSING METHOD, INFORMATION PROCESSING SYSTEM, AND PROGRAM

(71) Applicant: Panasonic Intellectual Property Corporation of America, Torrance, CA (US)

(72) Inventors: Masayoshi Tojima, Osaka (JP); Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 258 days.

(21) Appl. No.: 16/028,525

(22) Filed: Jul. 6, 2018

(65) Prior Publication Data
US 2019/0051064 A1    Feb. 14, 2019

Related U.S. Application Data

(60) Provisional application No. 62/542,527, filed on Aug. 8, 2017.

(30) Foreign Application Priority Data

Mar. 30, 2018    (JP) .............................. JP2018-068258

(51) Int. Cl.
    *G05D 1/00*    (2006.01)
    *G07C 5/02*    (2006.01)
    (Continued)

(52) U.S. Cl.
    CPC ............... *G07C 5/02* (2013.01); *B60W 30/08* (2013.01); *B60W 50/0205* (2013.01);
    (Continued)

(58) Field of Classification Search
    CPC ..... G07C 5/02; B60W 30/08; B60W 50/0205; B60W 2556/20; B60W 60/001;
    (Continued)

(56) References Cited

U.S. PATENT DOCUMENTS 8,305,204 B2 * 11/2012 Nagamine .............. B60Q 9/005
                                                    340/435
10,259,459 B2 * 4/2019 Takae .................. B60W 30/162
                      (Continued)

FOREIGN PATENT DOCUMENTS

JP    2016-216029    12/2016
JP    2017-144110    8/2017

OTHER PUBLICATIONS

The Extended European Search Report dated Feb. 11, 2019 for the related European Patent Application No. 18182530.8.

*Primary Examiner* — Donald J Wallace
*Assistant Examiner* — Daniel M. Robert
(74) *Attorney, Agent, or Firm* — Greenblum & Bernstein, P.L.C.

(57) ABSTRACT

Event-related information is acquired, and a judgment is made as to whether a particular event is detected. When a particular event is detected, direction information indicating a first direction is acquired, and first recognition result information is acquired as to a result of a recognition process as to an object located outside a vehicle. Furthermore, a judgment is made as to whether the first recognition result information includes a result of object recognition in the first direction and as to whether existence of a specific object in the first direction is detected. In a case where it is judged that the first recognition result information indicates that object recognition in the first direction is performed and existence of a specific object in the first direction is not detected, process completion information indicating that the vehicle (Continued)

has performed the recognition process in the first direction is generated and output.

19 Claims, 11 Drawing Sheets

(51) Int. Cl.
| | |
|---|---|
| *B60W 30/08* | (2012.01) |
| *G05B 23/02* | (2006.01) |
| *G06K 9/00* | (2006.01) |
| *B60W 50/02* | (2012.01) |
| *G06K 9/62* | (2006.01) |
| *G05D 1/02* | (2020.01) |

(52) U.S. Cl.
CPC ....... *G05B 23/0224* (2013.01); *G05D 1/0088* (2013.01); *G05D 1/0246* (2013.01); *G06K 9/00791* (2013.01); *G06K 9/00805* (2013.01); *G06K 9/6262* (2013.01); *G05B 2219/2637* (2013.01); *G05D 1/0274* (2013.01); *G05D 2201/0213* (2013.01)

(58) Field of Classification Search
CPC .. B60W 2554/00; B60W 50/04; B60W 50/14; B60W 2540/18; B60W 2520/10; B60W 2050/146; B60W 50/00; B60W 2050/0043; G05B 23/0224; G05B 2219/2637; G06K 9/00805; G06K 9/6262; G06K 9/00791; G05D 1/0088; G05D 1/0246; G05D 1/0274; G05D 2201/0213; B60K 2370/55; B60K 2370/162; B60K 37/06; B60K 35/00; H04W 4/80; H04M 1/7253
See application file for complete search history.

(56) References Cited

U.S. PATENT DOCUMENTS

| | | | |
|---|---|---|---|
| 10,386,856 B2* | 8/2019 | Wood | G05D 1/0214 |
| 10,597,043 B2* | 3/2020 | Kim | B60W 10/20 |
| 10,761,542 B1* | 9/2020 | Fairfield | G05D 1/0022 |
| 2002/0126002 A1* | 9/2002 | Patchell | G08G 1/162 |
| | | | 340/436 |
| 2003/0236605 A1 | 12/2003 | Takahashi | |
| 2006/0287826 A1* | 12/2006 | Shimizu | B60Q 1/0023 |
| | | | 701/431 |
| 2008/0312832 A1* | 12/2008 | Greene | G08G 1/166 |
| | | | 701/301 |
| 2012/0271484 A1* | 10/2012 | Feit | B60W 30/12 |
| | | | 701/1 |
| 2017/0123421 A1* | 5/2017 | Kentley | G08G 1/202 |
| 2017/0139418 A1 | 5/2017 | Hiramatsu et al. | |
| 2017/0239453 A1 | 8/2017 | Kawakita et al. | |
| 2017/0369067 A1* | 12/2017 | Saigusa | B60W 30/18163 |
| 2018/0093663 A1* | 4/2018 | Kim | B60W 10/18 |
| 2018/0286242 A1* | 10/2018 | Talamonti | B60W 30/14 |
| 2018/0308358 A1* | 10/2018 | Hayakawa | G01C 21/26 |
| 2019/0031105 A1* | 1/2019 | Kim | B60R 1/074 |
| 2019/0164424 A1* | 5/2019 | Kleen | H04W 4/46 |

* cited by examiner

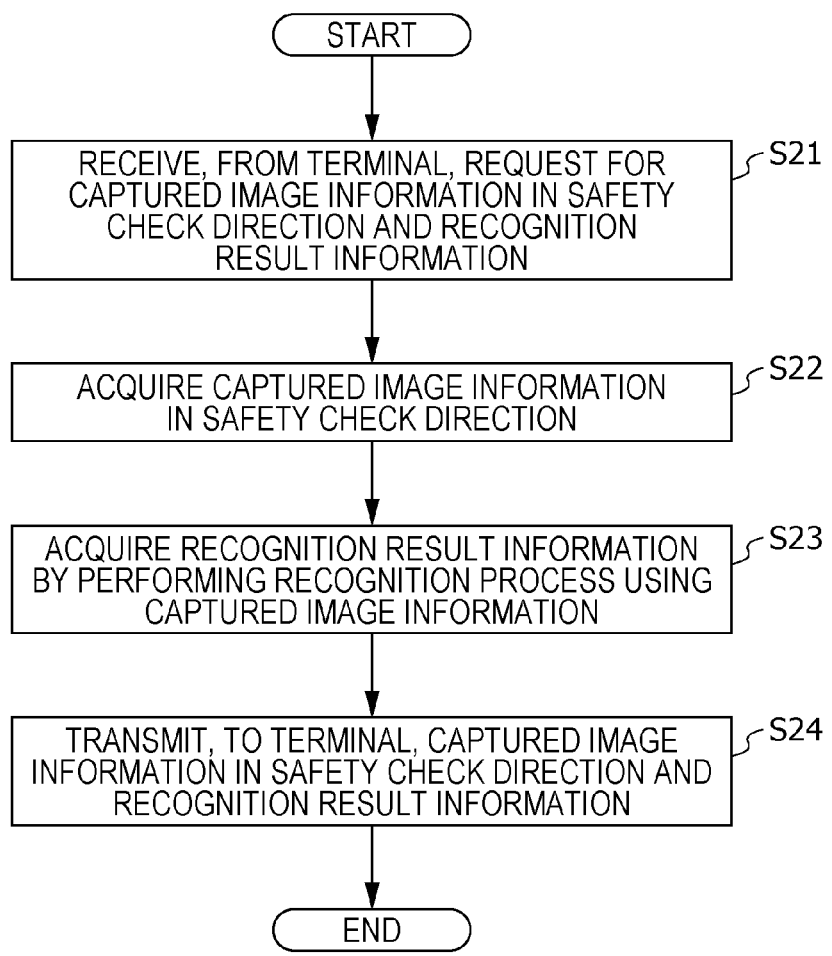

| No | OBJECT LOCATION | RECOGNIZED OBJECT |
|---|---|---|
| 1 | (−5 m, −1.5 m) | VEHICLE |
| 2 | (−6 m, 0 m) | BUILDING |
| ... | ... | ... |

FIG. 7

| EVENT TYPE | SAFETY CHECK DIRECTION |
|---|---|
| LEFT TURN | LEFT BACKWARD |
| RIGHT TURN | RIGHT, LEFT, RIGHT BACKWARD |
| ENTERING INTERSECTION | LEFT, RIGHT |
| STARTING DRIVING BACKWARD | BACKWARD, LEFT BACKWARD, RIGHT BACKWARD |
| START | FORWARD, BACKWARD, RIGHT BACKWARD |
| CHANGING LANE | FORWARD, RIGHT BACKWARD, BACKWARD |

| EVENT TYPE | SYMBOL |
|---|---|
| ENTERING INTERSECTION | A |
| LEFT TURN | B |
| RIGHT TURN | C |
| CHANGING LANE | D |
| CROSSING CROSSWALK | E |
| START | F |

INFORMATION PROCESSING METHOD, INFORMATION PROCESSING SYSTEM, AND PROGRAM

BACKGROUND

1. Technical Field

The present disclosure relates to an information processing method, an information processing system, and a program, for communicating with an autonomous mobile object such as an autonomous vehicle.

2. Description of the Related Art

In recent years, advances have been achieved in techniques related to an autonomous mobile object such as a vehicle (hereinafter, referred to as an autonomous vehicle). As one of such techniques, it is known to notify a passenger in the autonomous vehicle of information associated with driving control of the autonomous vehicle (for example, see Japanese Unexamined Patent Application Publication No. 2017-144110 and Japanese Unexamined Patent Application Publication No. 2016-216029).

In a technique disclosed in Japanese Unexamined Patent Application Publication No. 2017-144110, predetermined setting information in terms of driving control to be performed by the autonomous vehicle and a content of the driving control performed by the autonomous vehicle or the like are presented to a passenger in the autonomous vehicle in response to a command issued by the passenger.

In a technique disclosed in Japanese Unexamined Patent Application Publication No. 2016-216029, a content of driving control executable by an autonomous vehicle or the like is presented to a passenger in the autonomous vehicle.

SUMMARY

However, in the known techniques, although a passenger or another person can get to know a content of driving control, it is difficult to get to know a content of recognition process performed by a vehicle and how the driving control is performed depending on a result of the recognition process. For example, an evaluator who evaluates autonomous driving performed by an autonomous vehicle cannot get to know whether a predetermined item to be checked is actually checked or not by the autonomous vehicle in the autonomous driving.

One non-limiting and exemplary embodiment provides an information processing method that allows a person to get to know whether recognition process to be performed in vehicle driving is actually performed properly.

In one general aspect, the techniques disclosed here feature an information processing method including acquiring event-related information for detecting a particular event associated with a vehicle, making a judgment using the event-related information as to whether the particular event has been detected, in a case where it is judged that the particular event has been detected, acquiring direction information indicating a first direction associated with the particular event, acquiring first recognition result information obtained as a result of a recognition process performed by the vehicle as to an object located outside the vehicle, and judging whether the first recognition result information includes a result of object recognition in the first direction, judging, using the first recognition result information, whether there exists in the first direction a specific object that may influence the driving of the vehicle, in a case where it is judged that the specific object does not exist in the first direction and it is also judged that the first recognition result information includes the result of the object recognition in the first direction, generating process completion information indicating that the vehicle has performed the recognition process in the first direction, and outputting the generated process completion information.

An aspect of the present disclosure provides an information processing method that allows a person to get to know whether a recognition process in driving of a vehicle is properly performed.

General or specific embodiments may be implemented by a system, a method, an integrated circuit, a computer program, a computer-readable storage medium such as a CD-ROM, or any selective combination of a system, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a flow chart illustrating a processing procedure executed by an autonomous vehicle configured to communicate with an information processing system according to an embodiment;

FIG. 7 is a diagram illustrating an example of event-related information;

DETAILED DESCRIPTION

Figure 1:
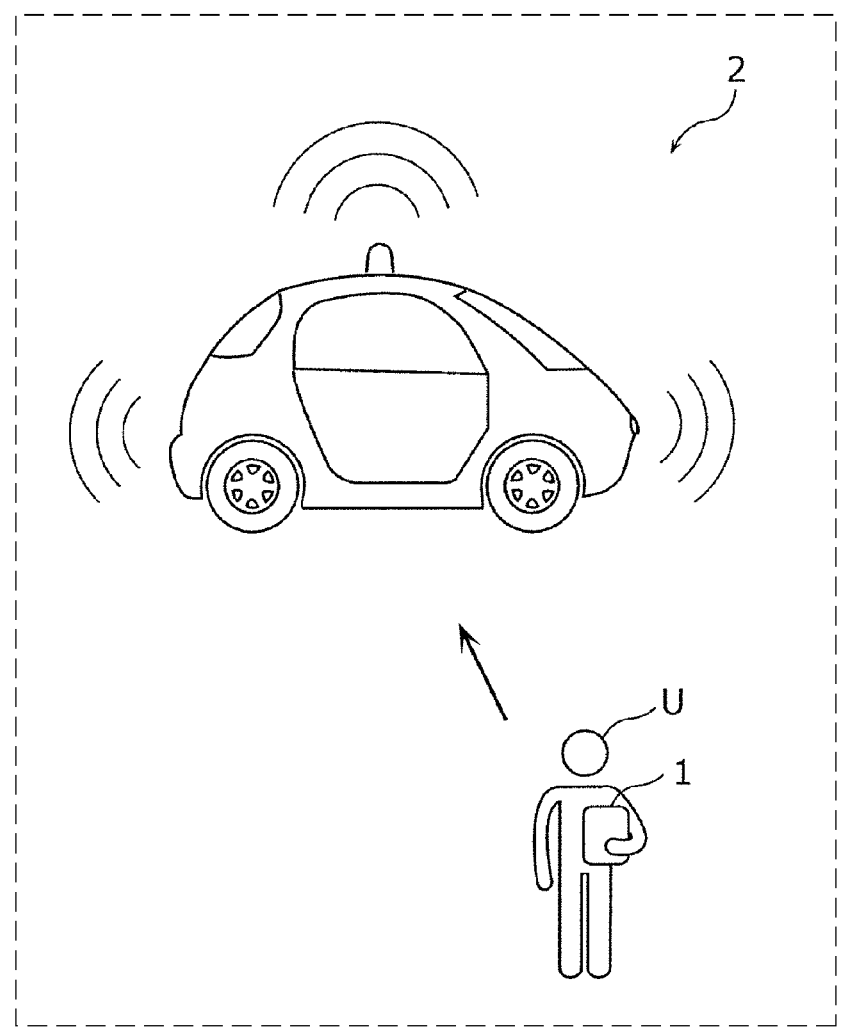
FIG. 1 is a diagram illustrating a configuration of a system including an information processing system according to an embodiment.

Underlying Knowledge Forming Basis of the Present Disclosure

The present disclosure has found that the known techniques have problems described below.

In recent years, a technique related to autonomous driving of a mobile object such as a vehicle has been known. Hereinafter, a mobile object having an autonomous driving capability will be referred to as an autonomous vehicle.

In the autonomous vehicle, when a driving control such as starting, stopping, left turning, right turning, or the like is performed, information on an environment around the autonomous vehicle is acquired using a sensor such as a camera or the like, and driving control is performed using the acquired information in a similar manner to a case where a safety check is performed by a human driver or the like when the human driver drives a vehicle that is not designed to perform autonomous driving.

Before an autonomous vehicle is allowed to begin running on public roads, it is necessary to evaluate whether the autonomous vehicle is capable of safely running on public roads. For example, an evaluator evaluates in advance whether the autonomous vehicle is capable of autonomously driving itself properly.

To evaluate whether the autonomous vehicle is capable of safely running, one of evaluation methods under consideration is to evaluate by a human evaluator whether the autonomous vehicle is capable of autonomously running along a test course of a driving school or the like.

When the evaluator evaluates the autonomous driving capability of the autonomous vehicle, it is desirable that it is allowed to make the evaluation in a similar manner to a case where manual driving is evaluated.

In the evaluation, even when it is evaluated that the autonomous vehicle is capable of properly performing autonomous driving, it is difficult to judge whether all items including environments around the autonomous vehicle to be checked in the autonomous driving are properly checked actually or not. In other words, there is a possibility that the autonomous vehicle performs the autonomous driving without checking all items, including an environment around the autonomous vehicle, specified in advance to be checked.

One of methods for handling the above situation is to display, on a display device or the like, a result of recognition performed by an autonomous vehicle as to objects located around the autonomous vehicle thereby presenting the recognition result to an evaluator. However, in a case where all objects located around the autonomous vehicle are displayed as the recognition result, the displayed objects include objects such as an object located far away, a static object such as a guardrail, or the like, for which it is not necessary to perform a safety check. This makes it difficult for the evaluator to correctly evaluate whether the autonomous vehicle properly performs the safety check, that is, it is difficult to correctly evaluate whether all items prespecified to be checked are properly checked.

To handle the above-described situation, the present disclosure provides an information processing method including acquiring event-related information for detecting a particular event associated with a vehicle, making a judgment using the event-related information as to whether the particular event has been detected, in a case where it is judged that the particular event has been detected, acquiring direction information indicating a first direction associated with the particular event, acquiring first recognition result information obtained as a result of a recognition process performed by the vehicle as to an object located outside the vehicle, and judging whether the first recognition result information includes a result of an object recognition in the first direction, judging, using the first recognition result information, whether there exists in the first direction a specific object that may influence the driving of the vehicle, in a case where it is judged that the specific object does not exist in the first direction and it is also judged that the first recognition result information includes the result of the object recognition in the first direction, generating process completion information indicating that the vehicle has performed the recognition process in the first direction, and outputting the generated process completion information.

Furthermore, to handle the situation described above, in an aspect, the present disclosure provides a program that causes a computer to execute the information processing method described above.

The method makes it possible for a person to get to know whether the recognition process in driving the vehicle is properly performed. For example, it is possible to present, to an evaluator who evaluates whether autonomous driving is properly performed by the autonomous vehicle, information indicating whether the recognition process in driving the autonomous vehicle is properly performed or not. This makes it possible for the evaluator to further check whether a safety check is properly performed by the autonomous vehicle at a point where safety check is necessary for each particular event in addition to checking the normal driving control in autonomous driving.

In this method, a direction in which a safety check is to be performed is preset for each particular event, and thus it is possible to properly evaluate whether the safety check in the particularly necessary direction is performed by the autonomous vehicle.

In a case where any one of specific objects including obstacles in autonomous driving is not recognized by the autonomous vehicle, information indicating this fact is displayed, and thus the evaluator is capable of getting to know whether the safety check is properly performed by the autonomous vehicle. That is, the evaluator can easily get to know whether the recognition process for the autonomous driving is properly performed by the autonomous vehicle.

Furthermore, in this method, when the autonomous vehicle controls the running in the autonomous driving, only information used in the judgement for the particular events is output, and thus it is possible to reduce the amount of processing in the output process. Thus, it is possible to effectively increase the operation speed of the output process.

For example, the information processing method may further include in a case where it is judged that the specific object exists in the first direction, generating the process completion information including first information indicating that the specific object is recognized in the first direction, while in a case where it is judged that the specific object does not exist in the first direction, generating the process completion information including second information indicating that the specific object is not recognized in the first direction.

This method makes it possible to more properly evaluate whether the recognition process for the autonomous driving is properly performed by the autonomous vehicle.

For example, the first recognition result information may be information acquired by performing the recognition process on an image obtained by capturing an image in a particular range in the first direction from the vehicle.

That is, this method is not applied, for example, to an autonomous driving system in which information is acquired from a camera or the like installed on a public road or the like, but may be applied to an autonomous vehicle capable of controlling driving using a camera installed on the autonomous vehicle. That is, this method is useful in particular for use in an autonomous vehicle in which control is performed not using an apparatus installed on a public road or the like but using an apparatus such as a camera installed on the autonomous vehicle.

For example, the information processing method may further include acquiring driving information on the vehicle including at least one of a steering angle of the vehicle and a vehicle speed, and the particular range may be determined depending on the driving information on the vehicle.

This method makes it possible for an evaluator to more easily get to know whether the recognition process for the autonomous driving is properly performed by the autonomous vehicle depending on the driving state of the autonomous vehicle.

The information processing method may further include outputting the acquired driving information on the vehicle together with the process completion information.

This method makes it possible for an evaluator to more easily get to know whether the recognition process for the autonomous driving is properly performed by the autonomous vehicle.

For example, in a case where the particular event is detected, the process completion information is further output repeatedly until the detected particular event is no longer detected or until a predetermined time has elapsed.

This method makes it possible for an evaluator to easily get to know whether the recognition process for the autonomous driving is always performed by the autonomous vehicle after the driving control is changed by the autonomous vehicle as long as this changed driving control state is maintained.

The information processing method may further include, in a case where it is judged that the specific object exists in the first direction, judging whether the vehicle has made a decision to perform a driving control or has changed the driving control because of the existence of the specific object, generating the first information including a result of the judgment as to whether the vehicle has made the decision or the change of the control.

This method makes it possible for an evaluator to more easily get to know whether the recognition process for the autonomous driving is properly performed by the autonomous vehicle.

The information processing method may further include judging, using the first recognition result information, whether the specific object exists in a second direction different from the first direction, and in a case where it is judged that the specific object exists in the second direction, generating the process completion information including information indicating the second direction.

In the driving control of the autonomous driving, information is processed in order of urgency of a situation represented by the information. For example, in a situation in which there is a specific object located very close to the autonomous vehicle, there is a possibility that it is necessary to immediately stop the running, and thus information on such a specific object is given high priority in the processing. Even in a case where information is low in urgency, if the information may influence the driving control, the information is also processed. For example, in a case where there is an object located not very close to the autonomous vehicle and thus it is not necessary to stop the running immediately, the existence of the object may influence the driving control and thus information on this object is also processed. In view of the above, the processor also judges whether there is a specific object such as an obstacle, which may influence the driving of the autonomous vehicle, in a direction other than a high-urgency direction, and the processor also outputs information that may cause a change in the content of the driving control. This makes it possible for the evaluator to more properly get to know whether the recognition process during the autonomous driving is properly performed by the autonomous vehicle.

The information processing method may further include acquiring an image generated by capturing an image in the first direction by an image capture apparatus installed in the vehicle, and outputting the acquired image together with the process completion information in a mode depending on the detected particular event.

This method makes it possible to more properly present to an evaluator the information processed by the autonomous vehicle.

The information processing method may further include in a case where it is judged that the first recognition result information does not include the result of object recognition in the first direction, generating non-execution information indicating that the recognition process in the first direction has not been performed by the vehicle and outputting the generated non-execution information.

This method makes it possible for an evaluator to more properly get to know that the autonomous driving is not properly performed by the autonomous vehicle.

In an aspect, the present disclosure provides an information processing system including an event judgment unit that acquires event-related information for detecting a particular event on a vehicle and that judges based on the event-related information whether the particular event is detected, a direction information acquisition unit that operates such that in a case where the event judgment unit judges that the particular event is detected, the direction information acquisition unit acquires direction information indicating a first direction related to the particular event, a vehicle process information acquisition unit that acquires first recognition result information obtained via a recognition process performed by the vehicle on an object located outside the vehicle, a vehicle recognition judgment unit that judges whether the first recognition result information includes a result of object recognition in the first direction, and judges, using the first recognition result information, whether there exists in the first direction a specific object that may influence the driving of the vehicle, a display information generation unit that generates process completion information such that in a case the vehicle recognition judgment unit judges that the specific object does not exist and the vehicle recognition judgment unit judges that the first recognition result includes the result of object recognition in the first direction, the display information generation unit generates the process completion information indicating that the vehicle has performed the recognition process in the first direction, and a display control unit that controls a display apparatus to display the process completion information generated by the display information generation unit.

This configuration makes it possible for a person to get to know whether the recognition process in driving the vehicle is properly performed. For example, it is possible to present, to an evaluator who evaluates whether autonomous driving is properly performed by the autonomous vehicle, information indicating a result of a judgment as to whether the recognition process in driving the vehicle is properly performed by the autonomous vehicle. This makes it possible for the evaluator to further check whether a recognition process is properly performed by the autonomous vehicle at a point where safety check is necessary for each particular event in addition to checking the normal driving control in autonomous driving.

In this configuration, a direction in which a safety check is to be performed (that is, a safety check direction) is preset for each particular event, and thus it is possible to properly evaluate whether the recognition process in the particularly necessary direction is performed by the autonomous vehicle.

Even in a case where any one of specific objects including obstacles in autonomous driving is not recognized by the autonomous vehicle, information indicating this fact is displayed, and thus the evaluator is capable of getting to know whether the recognition process is properly performed by the autonomous vehicle. That is, the evaluator can easily get to know whether the recognition process for the autonomous driving is properly performed by the autonomous vehicle.

In this configuration, when the autonomous vehicle controls the autonomous driving, only information used in the judgement of the particular events is output, and thus it is possible to reduce the amount of processing in the output process. Thus, it is possible to effectively increase the operation speed of the output process.

General or specific embodiments may be implemented by a system, a method, an integrated circuit, a computer program, a computer-readable storage medium such as a CD-ROM, or any selective combination of a system, a method, an integrated circuit, a computer program, and a storage medium.

Embodiments are described in further detail below with reference to drawings.

Note that any embodiment described below is provided to illustrate a general or specific example. That is, in the following embodiments of the present disclosure, values, shapes, materials, constituent elements, locations of the constituent elements and manners of connecting the constituent elements, steps, the order of steps, and the like are described by way of example but not limitation. Among constituent elements described in the following embodiments, those constituent elements that are not described in independent claims indicating highest-level concepts of the present disclosure are optional.

Embodiments

Outline

First, an outline of an information processing system according to an embodiment of the present disclosure is described below.

FIG. 1 is a diagram illustrating a configuration of a system including an information processing system according to an embodiment.

In FIG. 1, an autonomous vehicle 2, a terminal 1 configured to wirelessly communicate with the autonomous vehicle 2, and a user U that operates the terminal 1 are shown.

The terminal 1 is an example of the information processing system according to the embodiment of the present disclosure. The terminal 1 is a communication apparatus that communicates with the autonomous vehicle 2 and receives therefrom information associated with the driving control or the like of the autonomous vehicle.

The autonomous vehicle 2 is a mobile object capable of autonomously driving itself based on a predetermined arbitrary control program, that is, the autonomous vehicle 2 is an autonomous driving mobile object. In FIG. 1, a car (a vehicle) is shown as an example of the autonomous vehicle 2. Note that the autonomous vehicle 2 is not limited to a specific type, but the autonomous vehicle 2 may be any type of mobile object, such as a motorbike, a three-wheeled motor vehicle, and the like as long as it has an autonomous driving capability.

The user U is an evaluator who evaluates, using the terminal 1, whether the autonomous vehicle 2 is capable of properly performing autonomous driving. For example, the user U gets in the autonomous vehicle 2 and evaluates the operation of the autonomous vehicle 2.

In the example shown in FIG. 1, the autonomous vehicle 2 and the terminal 1 are provided separately. However, in a case where the user U gets in the autonomous vehicle 2 and the user U evaluates the operation of the autonomous vehicle 2, the autonomous vehicle 2 and the terminal 1 may be provided in an integrated form. For example, the terminal 1 may be connected to the autonomous vehicle 2 via a communication line such that it is allowed to perform wired communication, and may be disposed in the autonomous vehicle 2. Note that the user U does not necessarily need to be in the autonomous vehicle 2.

In the following description, it is assumed that the terminal 1 is employed as the information processing system according to the embodiment of the present disclosure. It is also assumed in the following description by way of example that the terminal 1 is held and used by the user U who is in the autonomous vehicle 2.

Configuration

A configuration of the terminal 1 according to the present embodiment of the disclosure is described below.

Figure 2:
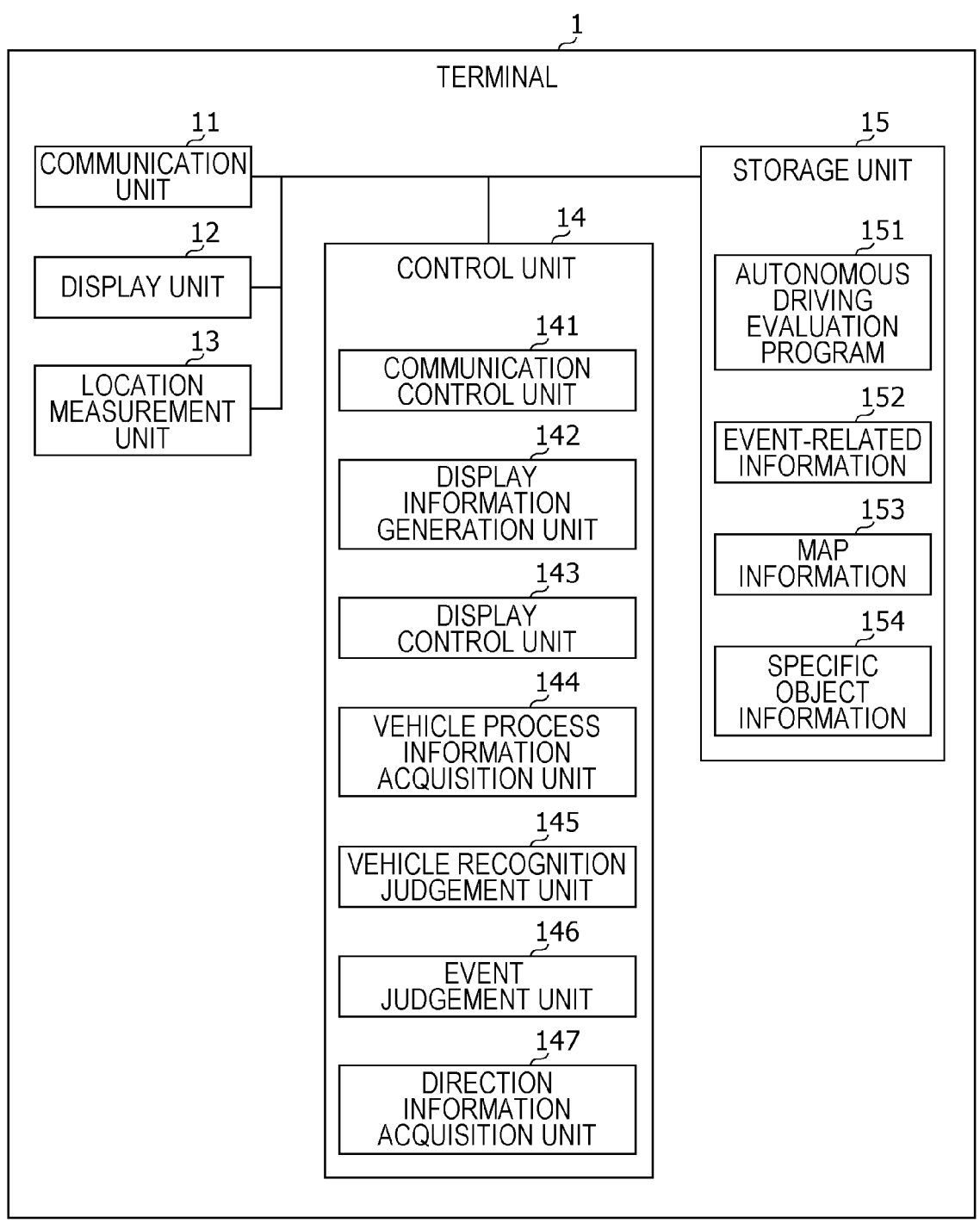
FIG. 2 is a block diagram illustrating a functional configuration of an information processing system according to an embodiment.

FIG. 2 is a block diagram illustrating a functional configuration of the terminal 1 which is an example of an information processing system according to an embodiment.

The terminal 1 is a communication apparatus for use in evaluating whether an autonomous vehicle 2 is capable of properly performing autonomous driving. More specifically, for example, the terminal 1 is a communication apparatus such as a smartphone, a tablet terminal, or the like capable of communicating with the autonomous vehicle 2. Note that the terminal 1 may be a dedicated computer or a server apparatus for realizing an information processing system according to the present embodiment. In this case, a display unit 12 and a location measurement unit 13 of the terminal 1 are provided in a terminal of a user U, and the terminal 1 transmits and receives data to and from the terminal of the user U via communication.

The terminal 1 includes a communication unit 11, a display unit 12, a location measurement unit 13, a control unit 14, and a storage unit 15.

The communication unit 11 is a communication interface such as a communication adapter or the like for communicating with the autonomous vehicle 2.

The display unit 12 displays information received from the autonomous vehicle 2, an image generated by the control unit 14, and the like. The display unit 12 is, for example, a display. More specifically, in the present embodiment, the display unit 12 is a touch panel display.

The location measurement unit 13 measures the location of the terminal 1. The location measurement unit 13 is realized, for example, using a GPS (Global Positioning System) receiver or the like, and acquires location information associated with the terminal 1.

The control unit 14 generates information, based on the information received from the autonomous vehicle 2, for use by the user U in evaluating whether the autonomous vehicle 2 is capable of properly autonomous driving, and the control unit 14 outputs the generated information to the display unit 12. The control unit 14 is realized, for example, by a CPU (Central Processing Unit). The control unit 14 includes, as functional units, a communication control unit 141, a display information generation unit 142, a display control unit 143, a vehicle process information acquisition unit 144, a vehicle recognition judgment unit 145, an event judgment unit 146, and a direction information acquisition unit 147.

The communication control unit 141 controls communication between the terminal 1 and the autonomous vehicle 2 by controlling the communication unit 11.

The event judgment unit 146 acquires event-related information 152 for detecting a particular event associated with the autonomous vehicle 2, and judges, based on the acquired event-related information 152, whether the particular event is detected. More specifically, the event judgment unit 146 judges, based on the event-related information 152, whether the particular event has occurred in the autonomous vehicle 2. For example, based on the location measured by the location measurement unit 13, the event-related information 152, and map information 153 or route information, the event judgment unit 146 judges whether the particular event has occurred in the autonomous vehicle 2. The particular event is an event associated with an operation or a location of the autonomous vehicle 2. More specifically, the particular event is a change in a driving control by the autonomous vehicle 2 as shown in further detail later with reference with FIG. 7, or a change in the location of the autonomous vehicle 2 to move to a particular location. For example, changing in the driving control by the autonomous vehicle 2 includes starting, stopping, right turning, left turning, and the like, and the movement of the autonomous vehicle 2 to the particular location includes entering an intersection and the like.

The direction information acquisition unit 147 acquires direction information such that when the event judgment unit 146 judges that the particular event has occurred in the autonomous vehicle 2, that is, when the particular event is detected, the direction information acquisition unit 147 acquires, using the event-related information 152, direction information indicating a safety check direction related to the detected particular event. Note that the safety check direction is an example of the first direction.

The vehicle process information acquisition unit 144 acquires information received by the communication unit 11 from the autonomous vehicle 2. More specifically, the vehicle process information acquisition unit 144 acquires recognition result information (first recognition result information) obtained as a result of a recognition process performed by the autonomous vehicle 2 as to an object located outside the autonomous vehicle 2. The recognition result information is information based on which it is possible to judge whether the object recognition process has been performed. More specifically, the recognition result information is information indicating whether the object recognition process has been performed, information indicating whether the object recognition process was successful, information indicating whether there is information associated with a recognized object, or the like. The information associated with the recognized object may indicate a type of the object, a shape of the object, a rectangle surrounding the object, a direction or a distance to the object from the image capture unit 22 (see FIG. 3) or the autonomous vehicle 2, and the like. For example, the recognition result information is information obtained as a result of the recognition process by the autonomous vehicle 2 on the captured image information (that is, the image) obtained by capturing an image within a particular range in the safety check direction from the autonomous vehicle 2. This configuration is not applied, for example, to an autonomous driving system in which information is acquired from a camera or the like installed on a public road or the like, but may be applied to an autonomous vehicle capable of controlling driving using a camera installed on the autonomous vehicle.

For example, the particular range may be determined such that driving information on the autonomous vehicle 2 including at least one of a steering angle and a vehicle speed of the autonomous vehicle 2 is acquired, and the particular range may be determined depending on the driving information. The method described above makes it possible for the user U to more easily get to know whether the recognition process for the autonomous driving is properly performed by the autonomous vehicle 2 depending on the driving state of the autonomous vehicle 2.

For example, in a case where the event judgment unit 146 detects a particular event, the event judgment unit 146 transmits a signal to the autonomous vehicle 2 via the communication unit 11 to request the autonomous vehicle 2 to provide driving information including the vehicle speed. The event judgment unit 146 determines the particular range based on the vehicle speed included in the driving information received from the autonomous vehicle 2, and the event judgment unit 146 transmits, to the autonomous vehicle 2, a signal to request the autonomous vehicle 2 to provide the captured image information in the safety check direction including the determined particular range.

The vehicle recognition judgment unit 145 makes a judgment, using the recognition result information acquired via the vehicle process information acquisition unit 144, as to the recognition process, performed by the autonomous vehicle 2, in the safety check direction. More specifically, the vehicle recognition judgment unit 145 judges whether a result of object recognition in the safety check direction is included in the recognition result information acquired via the vehicle process information acquisition unit 144. For example, the vehicle recognition judgment unit 145 judges whether the object recognition process in the safety check direction has been performed, whether the object recognition process in the safety check direction has been performed normally, or whether information on a recognized object exists within a recognition process range corresponding to the safety check direction. For example, in a case where the recognition process is an image recognition process, the vehicle recognition judgment unit 145 may perform a judgment based on an operation log of the object recognition process as to whether the object recognition process has been performed on an image in an area corresponding to the safety check direction. The vehicle recognition judgment unit 145 may judge whether there is a part that has failed to be recognized in an area of the image corresponding to the safety check direction. The vehicle recognition judgment unit 145 may judge whether there is a rectangle surrounding an object recognized at a location within an area of the image corresponding to the safety check direction.

Furthermore, the vehicle recognition judgment unit 145 judges, using the recognition result information whether there exists, in the safety check direction, a specific object having a possibility of influencing the driving of the autonomous vehicle 2. More specifically, the vehicle recognition judgment unit 145 makes a judgment, using a machine learning model obtained by learning recognition of specific objects, as to whether there is a specific object in the safety check direction. For example, the machine learning model may be a learning model using a neural network such as deep learning or the like, or a learning model using rule information such as a dictionary or the like. The vehicle recognition judgment unit 145 may make a judgment, using the machine learning model obtained by learning the recognition of general objects including objects other than the specific objects, as to whether there is an object in the safety check direction, and may make a judgment, using specific object information 154 described later, as to whether the object whose existence is detected via the judgement is a specific object or not. In the following description, it is assumed by way of example that this judgment method is used by the vehicle recognition judgment unit 145. Note that the specific objects may be arbitrarily determined. For example, an obstacle such as a pedestrian, an oncoming car, or the like having a possibility of obstructing the running, or n object such as a traffic signal or the like that is to be checked for safety may be specified as a specific object.

The display information generation unit 142 generates information to be displayed on the display unit 12. For example, in a case where the vehicle recognition judgment unit 145 judges that there is no specific object in the safety check direction and that the recognition result information includes a result of object recognition in the safety check direction, the display information generation unit 142 generates process completion information indicating that the autonomous vehicle 2 has performed the recognition process in the safety check direction.

The display control unit 143 outputs, to the display unit 12, the process completion information (more specifically, an image) generated by the display information generation unit 142, and controls the display unit 12 to display the process completion information. More specifically, for example, the display control unit 143 outputs the process completion information generated by the display information generation unit 142 to the display unit 12, and a user U makes an evaluation, based on the process completion information displayed on the display unit 12, as to whether the recognition process has been properly performed by the autonomous vehicle 2.

For example, in a case where the event judgment unit 146 has acquired the driving information associated with the autonomous vehicle 2, the driving information may be output to the display unit 12, and the display unit 12 may display the driving information. The method described above makes it possible for the user U to easily get to know whether the recognition process for the autonomous driving is properly performed by the autonomous vehicle 2.

For example, in a case where a particular event is detected by the event judgment unit 146, the display control unit 143 may repeatedly output the process completion information, and the process completion information may be continuously displayed on the display unit 12 until this particular event is no longer detected. For example, when the autonomous vehicle 2 makes a left turn, the display control unit 143 continuously outputs the process completion information to the display unit 12 since the left turn is started, that is, since this particular event is detected by the event judgment unit 146 until the left turn is completed, that is, until this particular event is no longer detected by the event judgment unit 146. For example, the event judgment unit 146 may judge whether the particular event is ended, based on the location information measured by the location measurement unit 13, or based on the distance travelled after the autonomous vehicle 2 starts running, or based on whether the travel time reaches a particular threshold value. This makes it possible for the user U to easily get to know whether the recognition process for the autonomous driving is always performed by the autonomous vehicle after the driving control is changed by the autonomous vehicle as long as this changed driving control state is maintained.

In a case where the vehicle recognition judgment unit 145 further judges that there is a specific object in the safety check direction, the display information generation unit 142 may generate process completion information including first information indicating that the specific object is detected in the safety check direction. On the other hand, in case where it is judged that no specific object exists in the safety check direction, the display information generation unit 142 may generate process completion information including second information indicating that no specific object is detected in the safety check direction. As described above, the display information generation unit 142 generates different information depending on whether there is a specific object, and displays the generated information on the display unit 12 via the display control unit 143. This makes it possible to properly evaluate whether the recognition process for the autonomous driving is properly performed by the autonomous vehicle 2.

In a case where the vehicle recognition judgment unit 145 judges that there is a specific object in the safety check direction, the event judgment unit 146 may judge whether the existence of the specific object has made a decision to perform driving control or has made a change in the driving control. For example, when a particular event is detected, the event judgment unit 146 transmits a signal to the autonomous vehicle 2 via the communication unit 11 to request the autonomous vehicle 2 to provide driving information. The event judgment unit 146 makes a judgment, based on the driving information received from the autonomous vehicle 2 and the event-related information 152, as to whether the autonomous vehicle 2 is running based on the event-related information 152. In this case, the display information generation unit 142 generates information including a judgment result as to whether the driving control by the autonomous vehicle 2 has been changed from the content of the driving control according to the event-related information 152, and the display information generation unit 142 displays the information on the display unit 12. This makes it possible for the user U to easily get to know whether the recognition process for the autonomous driving is properly performed by the autonomous vehicle 2.

In the autonomous vehicle 2, in some cases, an image is captured not only in the safety check direction based on the event-related information 152 but also in a plurality of directions around the autonomous vehicle 2. Furthermore, in some cases, the object recognition process is performed on each of the images captured in the respective directions. In this case, the terminal 1 may receive an image captured in a direction different from the safety check direction. In this case, for example, the vehicle process information acquisition unit 144 may further acquire recognition result information (second recognition result information) obtained as a result of a recognition process performed by the autonomous vehicle 2 as to an object located, in a direction (a second direction) different from the safety check direction, outside the autonomous vehicle 2. The vehicle recognition judgment unit 145 may make a judgment, using the second recognition result information, as to the recognition process performed by the autonomous vehicle 2 in the second direction. In a case where the vehicle recognition judgment unit 145 judges that there is an obstacle in the second direction, the display information generation unit 142 may generate process completion information including information indicating the second direction in which the obstacle exists. The display control unit 143 may controls the display unit 12 to display the process completion information generated by the display information generation unit 142. Note that the plurality of directions described above may be included in a single image. For example, the safety check direction and the second direction may be directions which are on the same image and which are different from each other. The image input to the recognition process may be a panoramic image obtained as a result of capturing an image using a camera such as an omnidirectional camera having a large angle of view.

In the driving control of the autonomous driving by the autonomous vehicle 2, information is processed in order of urgency. For example, in a case where there is a specific object very close to the autonomous vehicle 2, it is necessary for the autonomous vehicle 2 to stop running immediately, and thus information associated with such high urgency is given high priority in process. When information is low in urgency such as information on an object located far from the autonomous vehicle 2 which may not cause the autonomous vehicle 2 to stop immediately, if the information can influence the driving control, then the information is also processed. In view of the above, the judgment, as to whether there is a specific object such as an obstacle or the like that can influence the driving of the autonomous vehicle 2, is also made in other directions different from the high-urgency direction, and information that may cause the content of the driving control to be changed is also output. This makes it possible for the user U to more properly evaluate whether the recognition process for the autonomous driving is properly performed by the autonomous vehicle 2.

In some cases, the autonomous vehicle 2 captures images in the same direction (for example, in the safety check direction) from different positions. For example, in some cases, the autonomous vehicle 2 includes a plurality of cameras one of which is installed on a front side of the autonomous vehicle 2 and the other one is installed on the opposite side, that is, the rear side. In this configuration, to capture an image in a leftward direction from the autonomous vehicle 2, images in the leftward direction may be captured using both cameras respectively installed on the front and rear sides. In such a case, the display information generation unit 142 may select, based on the recognition result information, at least one image from the images obtained from the plurality of the cameras, and the display information generation unit 142 may provide the selected at least one image together with the process completion information to the display control unit 143. That is, the vehicle process information acquisition unit 144 may acquire a plurality of images generated by capturing images by the autonomous vehicle 2 in the safety check direction from different positions. In this case, based on the recognition result information, the display information generation unit 142 may select at least one of the plurality of images acquired by the vehicle process information acquisition unit 144, and, under the control of the display control unit 143, the selected images may be output together with the generated process completion information to the display unit 12. For example, based on the recognition result information, the display information generation unit 142 may select an image including a recognized object from the plurality of images and may output the selected image together with the process completion information to the display control unit 143. The display control unit 143 may control the display unit 12 to display the image and the process completion information generated by the display information generation unit 142.

The display control unit 143 may control the display unit 12 to display the image and the process completion information acquired from the display information generation unit 142 in a form depending on the particular event. For example, in a case where a left turn is detected, the display control unit 143 may display, on the display unit 12, the image and the process completion information in a form in which the autonomous vehicle 2 is looked down from above. In a case where entering an intersection is detected, the display control unit 143 may display the image and the process completion information on the display unit 12 in a mode in which the image seems to be seen from the inside of the autonomous vehicle 2. This makes it possible to more properly present to the user U the information processed by the autonomous vehicle 2.

The storage unit 15 is a storage medium that stores a control program executed by the control unit 14, information received from the autonomous vehicle 2, and the like. For example, the storage unit 15 is a storage medium such as an HDD (Hard Disk Drive), a ROM (Read Only Memory) realized using a flash memory or the like, a RAM (Random Access Memory), or the like.

In the storage unit 15, an autonomous driving evaluation program 151, event-related information 152, map information 153, and specific object information 154 are stored.

The autonomous driving evaluation program 151 is a control program for judging whether the autonomous vehicle 2 properly performs the autonomous driving under the control of the control unit 14.

The event-related information 152 is information, in the autonomous vehicle 2, indicating a type of particular event and a safety check direction related to the particular event. The event-related information 152 will be described in further detail later.

The map information 153 is information indicating a road on which the autonomous vehicle 2 runs, a traffic signal, a traffic sign, and the like.

The specific object information 154 is information indicating a specific object. Examples of objects indicated by the specific object information 154 include a pedestrian, a car, and the like. Note that specific object information 154 may include information indicating an object which is not a specific object. For example, the specific object information 154 may indicate an object such as a guardrail or the like which is not a specific object.

Note that the specific object information 154 may include information indicating an attribute of the object. For example, a "pedestrian" may have a different attribute, for example, depending on whether the pedestrian is walking against the autonomous vehicle 2 or the pedestrian is not moving, and the pedestrian may be regarded as a specific object or not depending on the attribute. More specifically, for example, the specific object information 154 may be "moving"+"pedestrian", "full face"+"pedestrian", "moving"+"full face"+"pedestrian", or the like. For the same object, the object may be regarded as a specific object or not a specific object depending on the distance to the object from the autonomous vehicle 2. For example, in a case where the distance of an object is smaller than a predetermined arbitrary threshold value, the object is judged as a specific object, while in a case where the distance of the object is greater than the threshold value, the object is judged as not a specific object. In this case, the specific object information 154 may be "closer than the threshold value"+"pedestrian" or the like. That is, the specific object information 154 may be determined in an arbitrary manner as described above.

Figure 3:
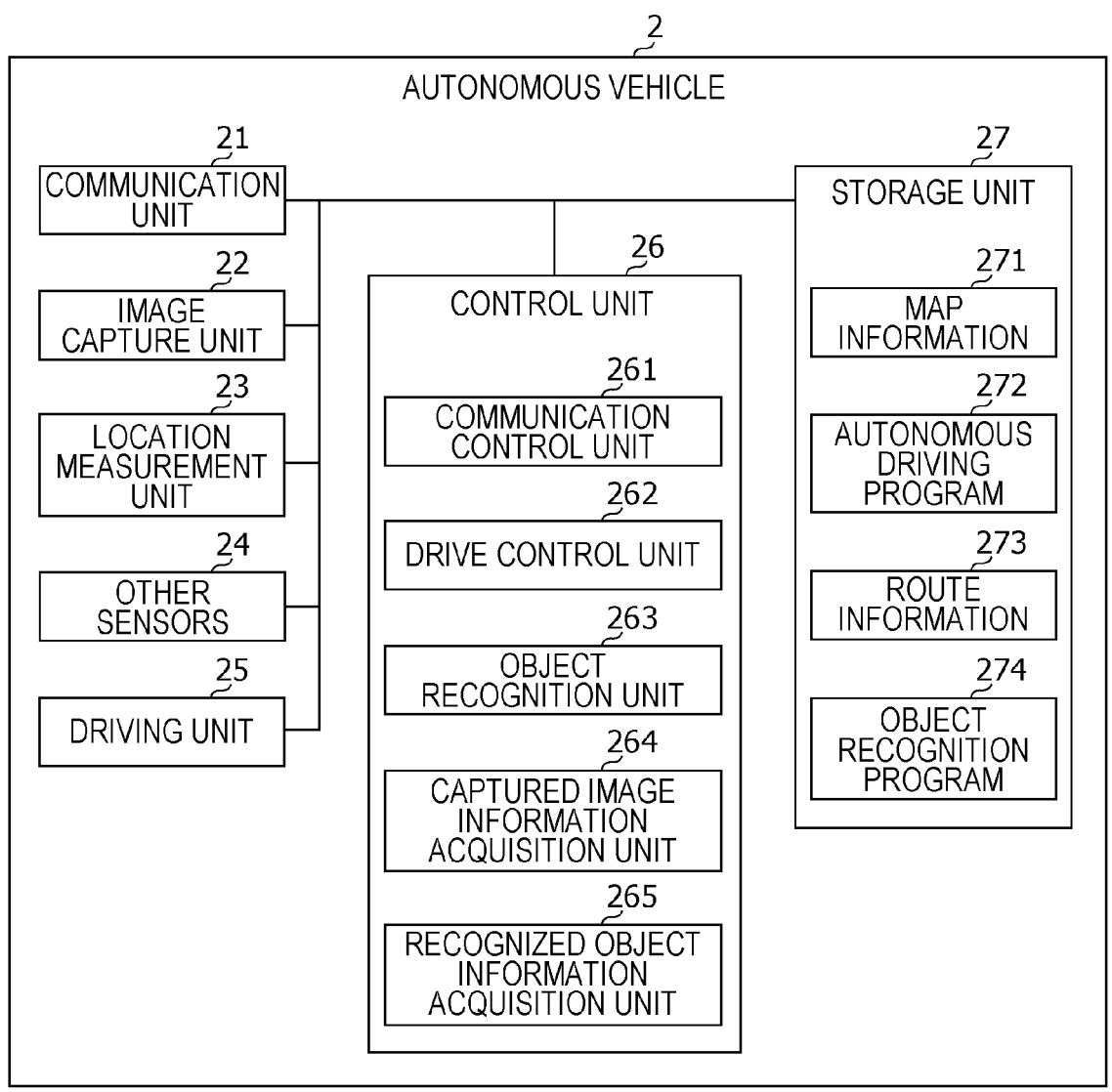
FIG. 3 is a block diagram illustrating a functional configuration of an autonomous vehicle configured to communicate with an information processing system according to an embodiment.

FIG. 3 is a block diagram illustrating a functional configuration of the autonomous vehicle 2 configured to communicate with the terminal 1 which is an example of an information processing system according to an embodiment.

The autonomous vehicle 2 is a mobile object that autonomously performs driving (that is, the driving control) based on a control program. For example, the autonomous vehicle 2 is a vehicle. The driving by the autonomous vehicle 2 may be performed in a fully autonomous manner without human intervention or in a semi-autonomous manner in which the driving is partially performed by a human driver.

The autonomous vehicle 2 includes a communication unit 21, an image capture unit 22, a location measurement unit 23, other sensor 24, a driving unit 25, a control unit 26, and a storage unit 27.

The communication unit 21 is a communication interface such as a communication adapter for communicating with the terminal 1.

The image capture unit 22 is a camera for capturing an image of the outside of the autonomous vehicle 2. The image capture unit 22 may be a single camera capable of moving to capture an image of the outside of the autonomous vehicle 2 over all directions, or may be a plurality of cameras each of which captures an image in one of forward or backward directions from the autonomous vehicle 2.

The location measurement unit 23 measures the location of the autonomous vehicle 2. The location measurement unit 23 is realized, for example, using a GPS receiver and a range sensor such as a LIDAR (Light Detection and Ranging, Laser Imaging Detection and Ranging), a millimeter-wave radar, or the like, and the location measurement unit 23 acquires location information of the autonomous vehicle 2 and location information of an object located within a particular range of the distance from the autonomous vehicle 2. The location measurement unit 23 may further measure the distance between the autonomous vehicle 2 and an object located in the neighbor of the autonomous vehicle 2.

The other sensors 24 are various kinds of sensors for measuring various parameters associated with the driving state such as the steering angle of the autonomous vehicle 2, the vehicle speed, or the like. More specifically, for example, the other sensors 24 may be a steering angle sensor, a velocity sensor, and the like.

The driving unit 25 is an apparatus that drives the autonomous vehicle 2, and the driving unit 25 may be realized, for example, by an engine, a battery, a drive train, and the like.

The control unit 26 is a control apparatus that controls the driving of the autonomous vehicle 2 by controlling the driving unit 25 based on information acquired by capturing an image by the image capture unit 22, information acquired by the location measurement unit 23, and the map information 271 and the route information 273 stored in the storage unit 27. The control unit 26 is realized, for example, by a CPU. The control unit 26 includes, functionally, a communication control unit 261, a drive control unit 262, an object recognition unit 263, a captured image acquisition unit 264, and a recognized object information acquisition unit 265.

The communication control unit 261 controls communication between the terminal 1 and the autonomous vehicle 2 by controlling the communication unit 21.

The drive control unit 262 controls the driving of the autonomous vehicle 2 by controlling the driving unit 25 based on the map information 271, the route information 273, and the recognition result information obtained from the object recognition unit 263.

The captured image information acquisition unit 264 acquires an image of the outside of the autonomous vehicle 2, as captured image information, by controlling the image capture unit 22.

The object recognition unit 263 recognizes an object included in the image acquired as the captured image information by the captured image information acquisition unit 264 by analyzing the image based on an object recognition program 274. The object recognition unit 263 generates recognition result information including information on the recognized object and the like. The generated recognition result information is stored in the storage unit 27.

The recognized object information acquisition unit 265 transmits the recognition result information generated by the object recognition unit 263 to the terminal 1 via the communication unit 21. For example, when the recognized object information acquisition unit 265 receives a request for the recognition result information from the terminal 1, the recognized object information acquisition unit 265 acquires the recognition result information from the storage unit 27 and provides the recognition result information to the communication control unit 261. The recognition result information is transmitted to the terminal 1 via the communication control unit 261 and the communication unit 21.

The storage unit 27 is a storage medium that stores a control program executed by the control unit 26, information received from the terminal 1, and the like. The storage unit 27 is, for example, a storage medium such as an HDD, a ROM realized by a flash memory or the like, a RAM, or the like.

In the storage unit 27, the map information 271, the autonomous driving program 272, the route information 273, and the object recognition program 274 are stored.

The map information 271 is map information used in the driving control of the autonomous vehicle 2. The map information 271 may include information similar to that included in the map information 153 shown in FIG. 2.

The autonomous driving program 272 is a control program by which to control the autonomous driving of the autonomous vehicle 2 and which is executed by the drive control unit 262.

The route information 273 is information indicating a running route along which the autonomous vehicle 2 is to run.

The object recognition program 274 is a control program executed by the object recognition unit 263 to recognize an object.

Processing Procedure

Next, a procedure performed by the terminal 1 and a procedure performed by the autonomous vehicle 2 according to an embodiment of the disclosure are described below.

First, the procedure performed by the terminal 1 according to the embodiment of the disclosure is described below.

Figure 4:
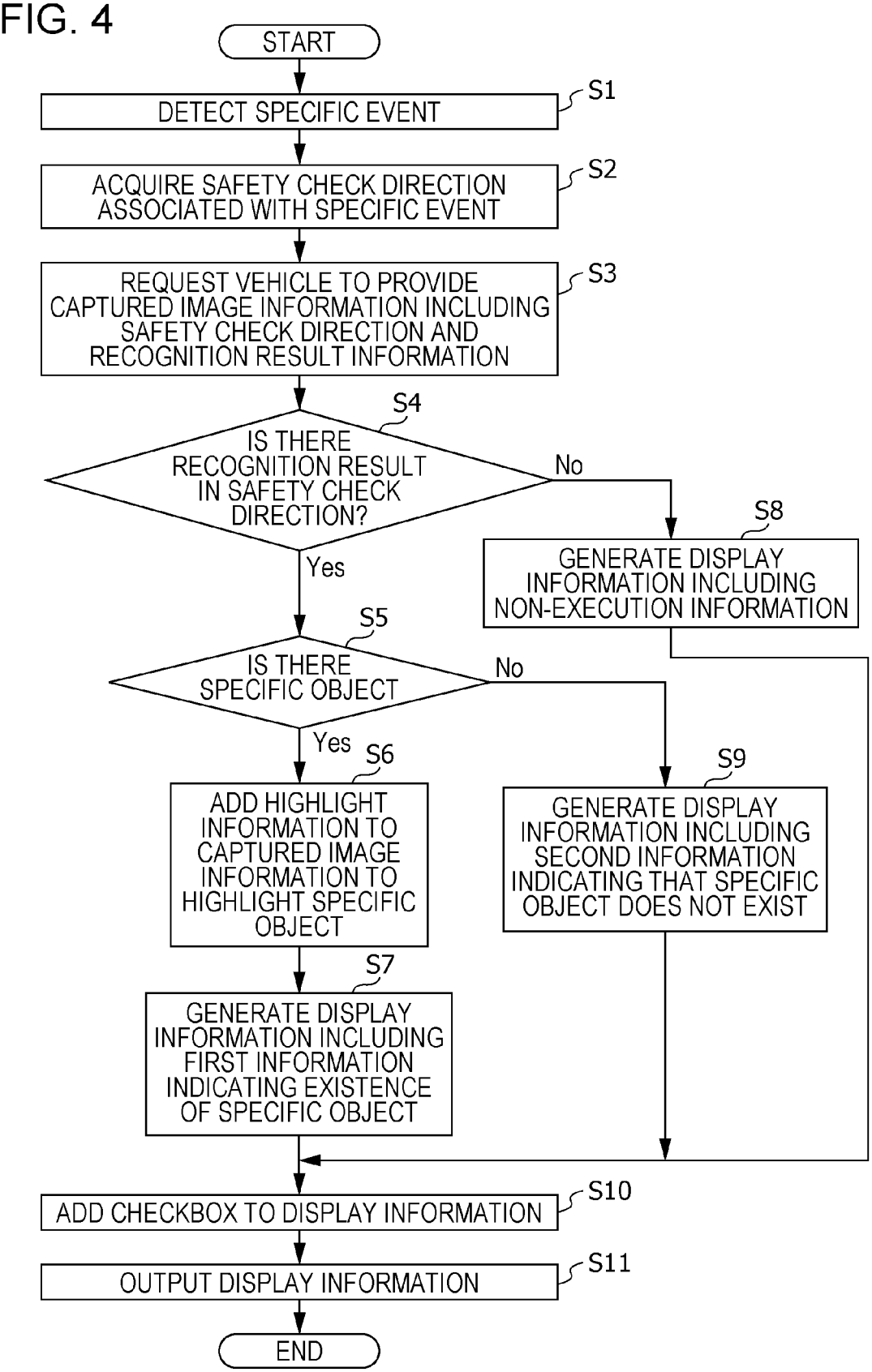
FIG. 4 is a flow chart illustrating a processing procedure executed by an information processing system according to an embodiment.

FIG. 4 is a flow chart illustrating a processing procedure executed by the terminal 1 according to the embodiment of the disclosure.

First, the user U gets in the autonomous vehicle 2 while carrying the terminal 1. The autonomous vehicle 2 starts autonomous driving.

The terminal 1 detects a particular event, for example, based on location information of the terminal 1 acquired by the location measurement unit 13, the map information 153 or route information, and the event-related information 152 (step S1). More specifically, in step S1, the terminal 1 acquires, from the map information 153, a type of a location indicated by the location information of the terminal 1 acquired by the location measurement unit 13, and the terminal 1 judges whether the acquired type of the location is coincident with the type of the location indicated by the event-related information 152. Furthermore, based on a route following the location indicated by the location information indicating the location of the terminal 1 acquired by the location measurement unit 13, the terminal 1 makes a judgment as to whether to make a change in the driving control of the autonomous vehicle 2, and the terminal 1 judges whether the changed driving control is coincident with a driving control indicated by the event-related information 152.

In a case where the autonomous vehicle 2 runs along a predetermined fixed route, it is possible to judge the timing of the particular event from the travel distance, and thus the terminal 1 may calculate the travel distance of the autonomous vehicle 2 based on, for example, the location information of the terminal 1 acquired by the location measurement unit 13 and may judge from the calculated travel distance whether the particular event occurs.

Next, the terminal 1 acquires, from the event-related information 152, a safety check direction related to the particular event detected in step S1 (step S2).

Next, the terminal 1 sends a signal to the autonomous vehicle 2 to request the autonomous vehicle 2 to provide captured image information including the safety check direction and the recognition result information (step S3). Note that if captured image information including the safety check direction can be acquired, the request issued to the autonomous vehicle 2 may be a simple request for captured image information without specifying that the captured image information includes the safety check direction.

Next, the terminal 1 receives captured image information and recognition result information from the autonomous vehicle 2 and judges whether the received recognition result information includes a result of object recognition in the safety check direction (step S4).

In a case where the terminal 1 judges that the recognition result information received from the autonomous vehicle 2 includes the result of object recognition in the safety check direction (Yes in step S4), the terminal 1 further judges, using the received recognition result information, whether there is a specific object in the safety check direction (step S5).

In a case where the terminal 1 judges that there is a specific object (Yes in step S5), the terminal 1 adds highlighting information to the captured image information such that the specific object is highlighted (step S6).

Next, the terminal 1 generates display information including the captured image information added with the highlighting information and information (first information) indicating that the specific object exists in the safety check direction, that is, process completion information (step S7).

On the other hand, in a case where the terminal 1 judges that the information received from the autonomous vehicle 2 does not include recognition result information in the safety check direction (No in step S4), the terminal 1 generates display information including the captured image information and non-execution information indicating that the recognition process in the safety check direction is not performed in the autonomous vehicle 2 (step S8). This method makes it possible for the user U to properly get to know that the autonomous driving is not properly performed by the autonomous vehicle 2.

In a case where the terminal 1 judges that no specific object exists (No in step S5), the terminal 1 generates display information including captured image information and information (second information) indicating that no obstacle exists in the safety check direction, that is, process completion information (step S9).

After step S7, step S8, or step S9, the terminal 1 adds, to the display information, a check box for use by the user U to input an evaluation result as to whether the recognition process is properly performed by the autonomous vehicle 2 (step S10).

Next, the terminal 1 outputs the display information generated in step S10 (step S11).

The method described above makes it possible to present, to the user U who evaluates whether the recognition process for the autonomous driving is properly performed by the autonomous vehicle 2, information indicating whether the recognition process for the autonomous driving of the autonomous vehicle 2 is properly performed. That is, this method makes it possible for the user U to get to know whether the recognition process associated with the driving of the autonomous vehicle 2 is properly performed.

FIG. 5 is a flow chart illustrating a processing procedure executed by the autonomous vehicle 2 that communicates with the terminal 1 that is an example of the information processing system according to the embodiment.

First, the user U gets in the autonomous vehicle 2 while carrying the terminal 1. The autonomous vehicle 2 starts autonomous driving.

Let it be assumed here that the autonomous vehicle 2 receives, from the terminal 1, a signal indicating a request for captured image information in a safety check direction and recognition result information (step S21). That is, step S21 is a step performed after step S3 shown in FIG. 4.

Next, the autonomous vehicle 2 acquires captured image information in the safety check direction (step S22). More specifically, the autonomous vehicle 2 acquires an image in the safety check direction as captured image information from the image capture unit 22 operating to capture the image.

Next, the autonomous vehicle 2 acquires recognition result information, which is information indicating an object included in the captured image information, by using the captured image information acquired in step S22 (and more specifically, by performing a recognition process using the captured image information) (step S23).

Next, the autonomous vehicle 2 transmits the captured image information acquired in step S22 and the recognition result information acquired in step S23 to the terminal 1 (step S24). Note that the captured image information and the recognition result information are acquired during the autonomous driving of the autonomous vehicle 2 regardless of whether a request for them is issued or not. Therefore, in response to a request, the captured image information and the recognition result information that have already been acquired may be transmitted.

After step S24, the terminal 1 executes step S4 shown in FIG. 4.

Figures 6A, 6B:
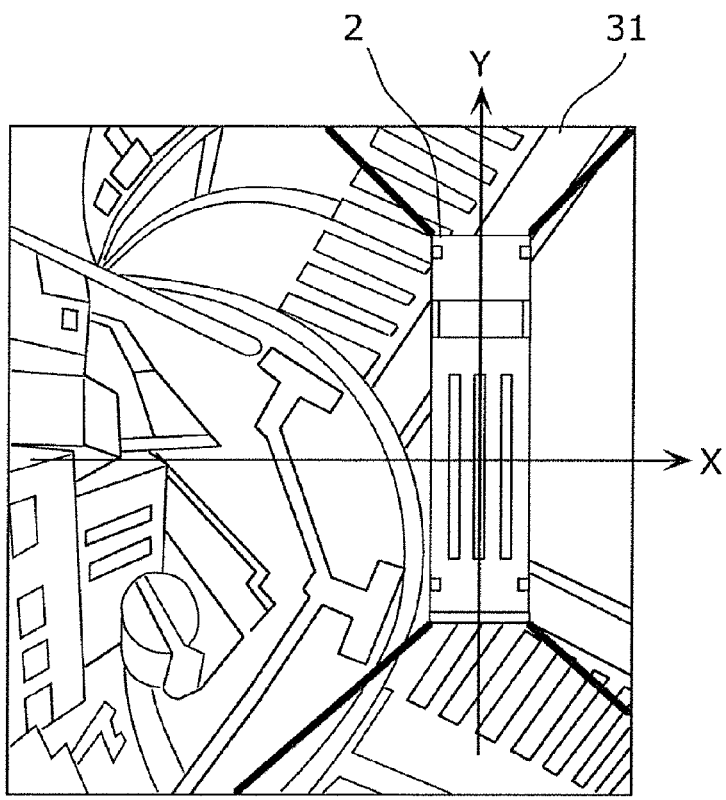
FIG. 6A is a diagram illustrating an example of an image including an autonomous vehicle configured to communicate with an information processing system according to an embodiment.
FIG. 6B is a diagram illustrating examples of distances to objects from an autonomous vehicle configured to communicate with an information processing system according to an embodiment.

FIG. 6A is a diagram illustrating an example of an image which is captured image information including the autonomous vehicle 2 configured to communicate with the terminal 1 which is an example of an information processing system according to an embodiment. FIG. 6B is a diagram illustrating examples of distances to objects from the autonomous vehicle 2 configured to communicate with the terminal 1 which is an example of an information processing system according to an embodiment. That is, FIG. 6A is a diagram illustrating an example of captured image information, and FIG. 6B is a diagram illustrating an example of recognition result information.

The autonomous vehicle 2 transmits captured image information to the terminal 1. More specifically, for example, a captured image 31 obtained by capturing an image around the autonomous vehicle 2 is transmitted as captured image information to the terminal 1.

The autonomous vehicle 2 recognizes, via the recognition process, the distance to an object from the autonomous vehicle 2 and also an object type, and the autonomous vehicle 2 transmits the recognized distance and the type as recognition result information to the terminal 1. FIG. 6B illustrates an example of recognition result information indicating locations (coordinates) of objects such that an origin is taken at the center of the autonomous vehicle 2 as seen from the above, a direction passing through the origin and being parallel to the running direction of the autonomous vehicle 2 is taken as a Y-axis direction, a direction passing through the origin and perpendicular to the Y-axis direction is taken as an X-axis direction.

FIG. 7 is a diagram illustrating an example of event-related information 152.

In the storage unit 15 of the terminal 1, event-related information 152 such as that shown in FIG. 7 is stored.

The event-related information 152 includes event types of particular events such as a left turn, a right turn, or the like that occur in the autonomous vehicle 2, and safety check directions corresponding to the respective particular events. When a particular event is detected, the terminal 1 acquires direction information indicating a safety check direction corresponding to the detected particular event from the event-related information 152 such as that shown in FIG. 7.

Figures 8A, 8B:
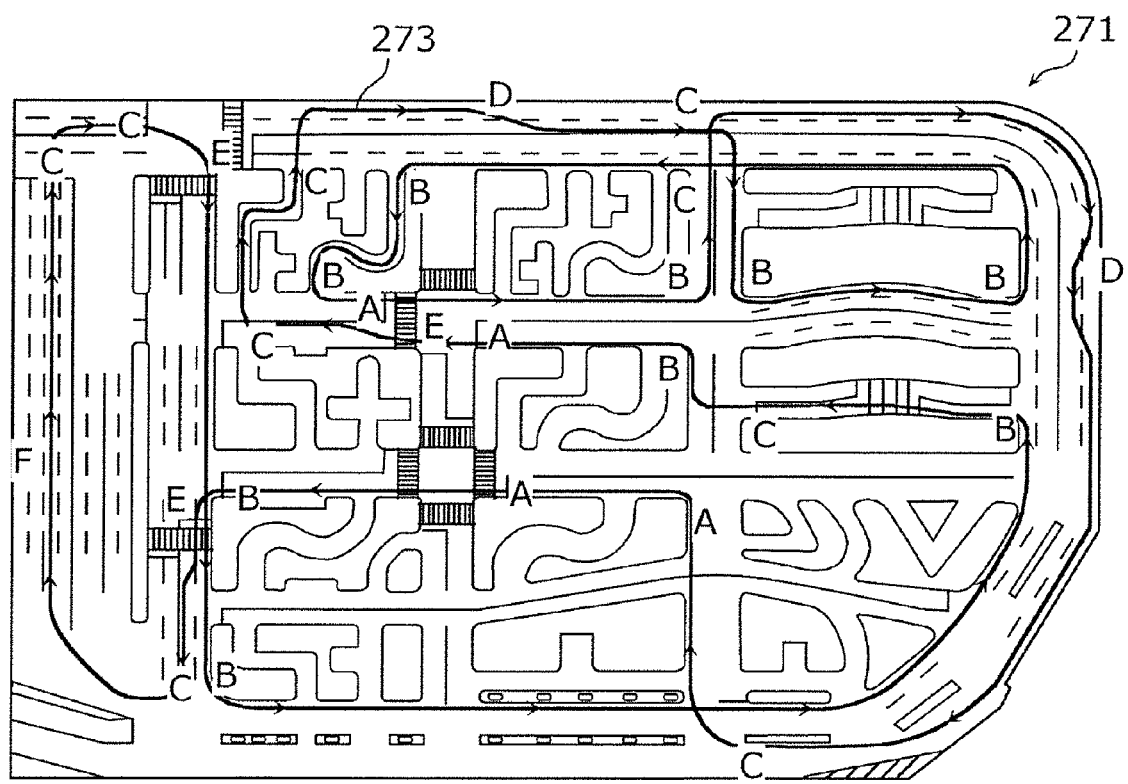
FIG. 8A is a diagram illustrating an example of map information and route information.
FIG. 8B is a diagram showing descriptions of points on the map information shown in FIG. 8A.

FIG. 8A is a diagram illustrating an example of map information 271 and route information 273. FIG. 8B is a diagram illustrating descriptions of points on the map information 271 shown in FIG. 8A.

The autonomous vehicle 2 controls the driving based on the map information 271 and the route information 273 such as those shown in FIG. 8A. For example, when the autonomous vehicle 2 arrives at one of A points shown in FIG. 8A and enters an intersection, an occurrence of a particular event of an event type of "entering intersection" shown in FIG. 8B is detected. In this case, images at least in the leftward and leftward directions seen from the autonomous vehicle 2 are captured as shown in FIG. 7, and the autonomous driving is performed based on a result of a recognition process using the captured images. In this situation, captured image information and recognition result information are generated.

Based on the event-related information 152, the terminal 1 acquires, from the autonomous vehicle 2, the captured image information obtained by capturing images in directions including the safety check direction related to the particular event (as shown in FIG. 7) and the recognition result information obtained by performing the recognition process using the captured image information, and the terminal 1 judges whether the recognition process specified to be executed at the detected particular event is properly executed or not by the autonomous vehicle 2, and the terminal 1 displays an image according to a judgment result. Based on the displayed image, the user U evaluates whether there is a problem or not in the autonomous driving performed by the autonomous vehicle 2.

Display Information

Next, display information output by the terminal 1 according to an embodiment of the disclosure is described below. As a specific example of the display information output by the terminal 1 (that is, display information output by the terminal 1 in step S11 shown in FIG. 4), an image of a GUI (Graphical User Interface) displayed on the display unit 12 of the terminal 1 is described below.

First Example

Figure 9A:
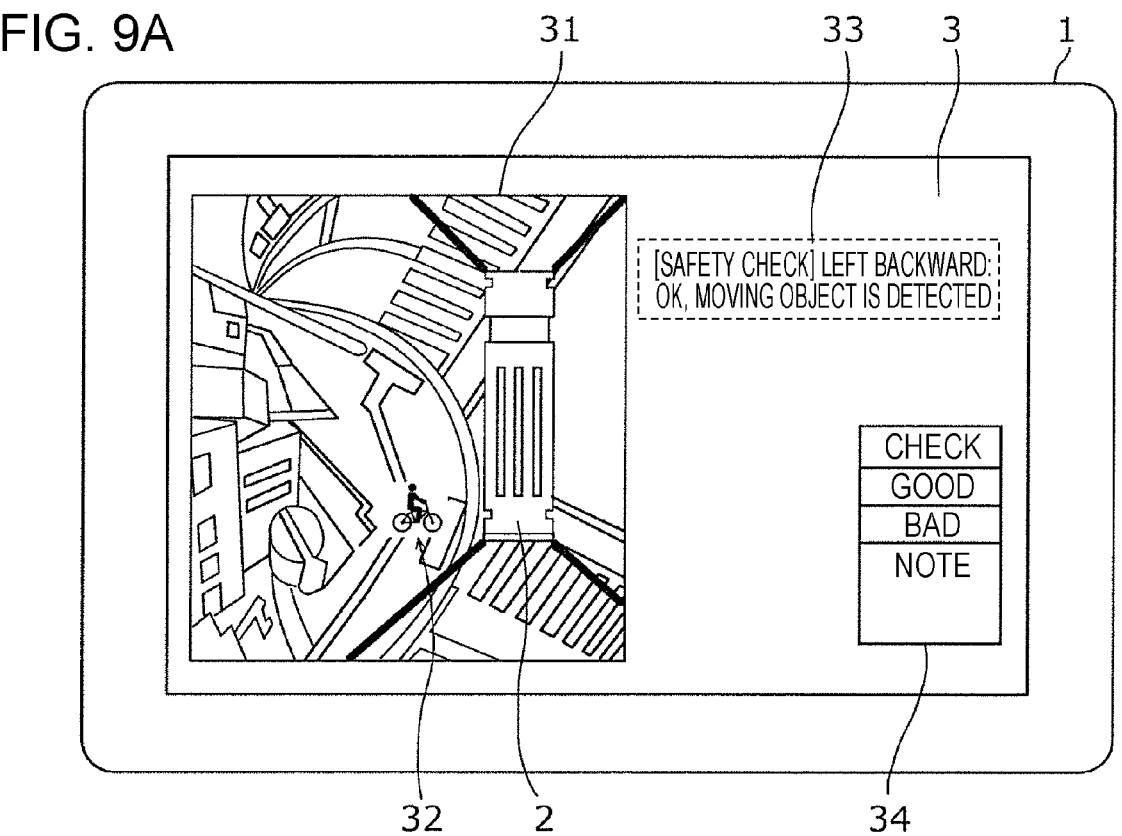
FIG. 9A is a diagram illustrating a first example of an image displayed in an information processing system according to an embodiment.

FIG. 9A is a diagram illustrating a first example of an image displayed on the terminal 1 according to an embodiment. An image 3 is an example of the display information.

The image 3 includes a captured image 31 captured by the autonomous vehicle 2, a safety check image 33, and a check box 34. The safety check image 33 is an example of an image representing first information indicating that a specific object in the safety check direction is recognized by the autonomous vehicle 2.

The captured image 31 is an image including captured image information acquired by the terminal 1 from the autonomous vehicle 2. More specifically, the captured image 31 is a composite image obtained by combining images respectively captured by a plurality of image capture units 22, and a bird's-eye view image of the autonomous vehicle 2 is superimposed on this composite image. In the specific example shown in FIG. 9A, the captured image 31 includes the autonomous vehicle 2 and an object 32.

The safety check image 33 is an image including information indicating whether the recognition result information acquired by the terminal 1 from the autonomous vehicle 2 includes recognition result information in the safety check direction and information indicating a judgment result as to whether existence of a specific object is detected from the recognition result information. FIG. 9A shows an example of the safety check image 33 including information indicating a safety check direction, information indicating whether recognition result information include recognition result information in this safety check direction, and information indicating whether an object is recognized or not. In this specific example, "LEFT BACKWARD: OK, MOVING OBJECT IS DETECTED" is displayed as the safety check image 33.

By watching the safety check image 33, the user U gets to know whether the recognition process for the autonomous driving is properly performed by the autonomous vehicle 2, and evaluates whether the object 32 is correctly recognized by the autonomous vehicle 2 via the recognition process. The user U stores an evaluation result by operating the check box 34.

In a case where the recognition result information acquired from the autonomous vehicle 2 includes recognition result information in a safety check direction, the terminal 1 displays, for example, "LEFT BACKWARD: OK, MOVING OBJECT IS DETECTED" as the safety check image 33 as shown in FIG. 9A. In a case where the recognition result information does not include recognition result information in the safety check direction, the terminal 1 displays an image of non-execution information, such as "NG" or the like, as the safety check image 33. This makes it possible for the user U to get to know, by watching the safety check image 33, whether the recognition process is properly performed by the autonomous vehicle 2. That is, the user U can easily get to know whether the autonomous driving is properly performed by the autonomous vehicle 2.

The check box 34 includes descriptions such as "Good", "Bad", and the like. In a case where an object 32 is displayed, the user U reads a description such as "LEFT BACKWARD: OK, MOVING OBJECT IS DETECTED" or the like displayed as the safety check image 33, and the user U evaluates whether the recognition process in the safety check direction specified to be checked at the particular event by the autonomous vehicle 2 is correctly performed or not. In a case where the user U evaluates that the recognition process is correctly performed, the user U selects "Good" in the check box 34, but otherwise the user U selects "Bad".

By repeating the operation described above each time a particular event occurs, the user U can easily get to know whether the recognition process for the autonomous driving is properly performed by the autonomous vehicle 2.

Second Example

Figure 9B:
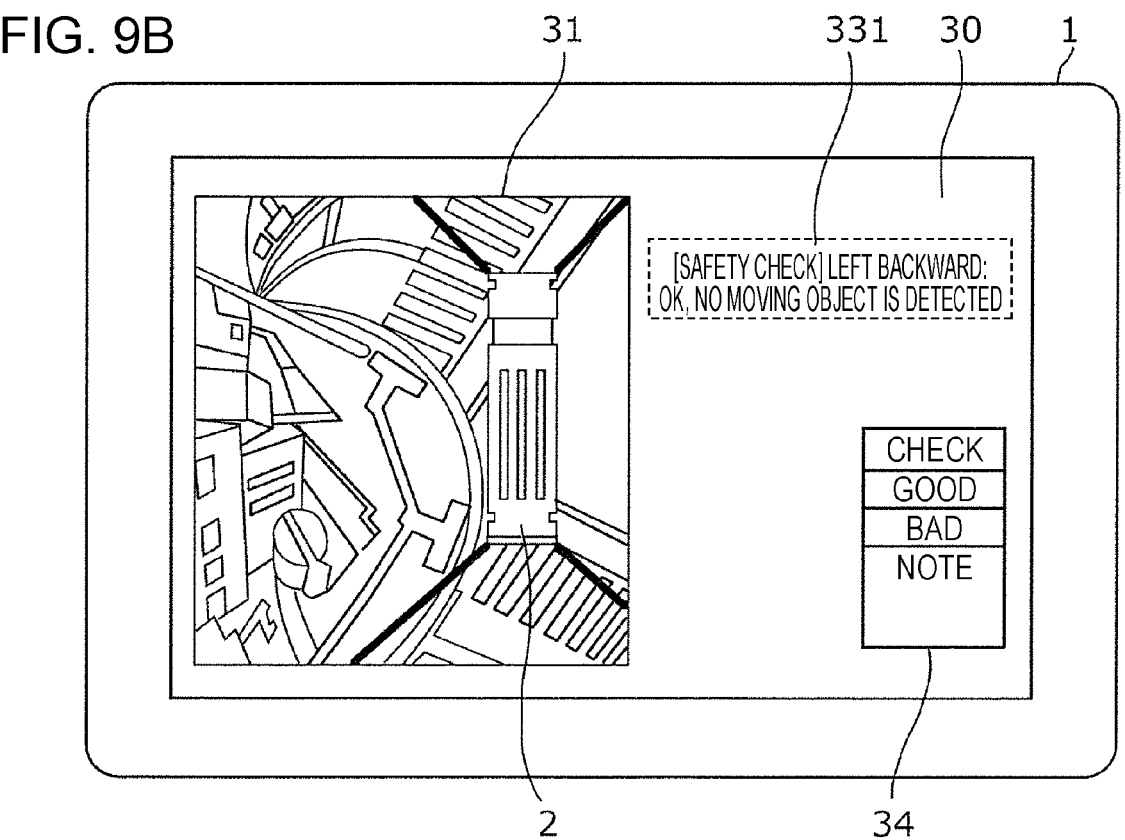
FIG. 9B is a diagram illustrating a second example of an image displayed in an information processing system according to an embodiment.

FIG. 9B is a diagram illustrating a second example of an image displayed on the terminal 1 according to an embodiment. An image 30 is an example of display information.

The image 30 includes a captured image 31 captured by the autonomous vehicle 2, a safety check image 331, and a check box 34. The safety check image 331 is an example of an image representing second information indicating that a specific object in the safety check direction is not recognized by the autonomous vehicle 2.

Unlike the image 3 shown in FIG. 9A, the captured image 31 does not include the object 32. In this case, when the terminal 1 judges that recognition result information is acquired from the autonomous vehicle 2 and judges that the recognition result information indicates that there exists no specific object, the safety check image 331 including second information indicating that there is no specific object is displayed in the image 30. More specifically, for example, "LEFT BACKWARD: OK, NO MOVING OBJECT IS DETECTED" is displayed as the safety check image 331.

Even in the case where no object 32 is displayed in the captured image 31, the safety check image 331 indicating, for example, "LEFT BACKWARD: OK, NO MOVING OBJECT IS DETECTED" makes it possible for the user U to get to know that the recognition process for the autonomous driving is properly performed by the autonomous vehicle 2.

Third Example

Figure 10:
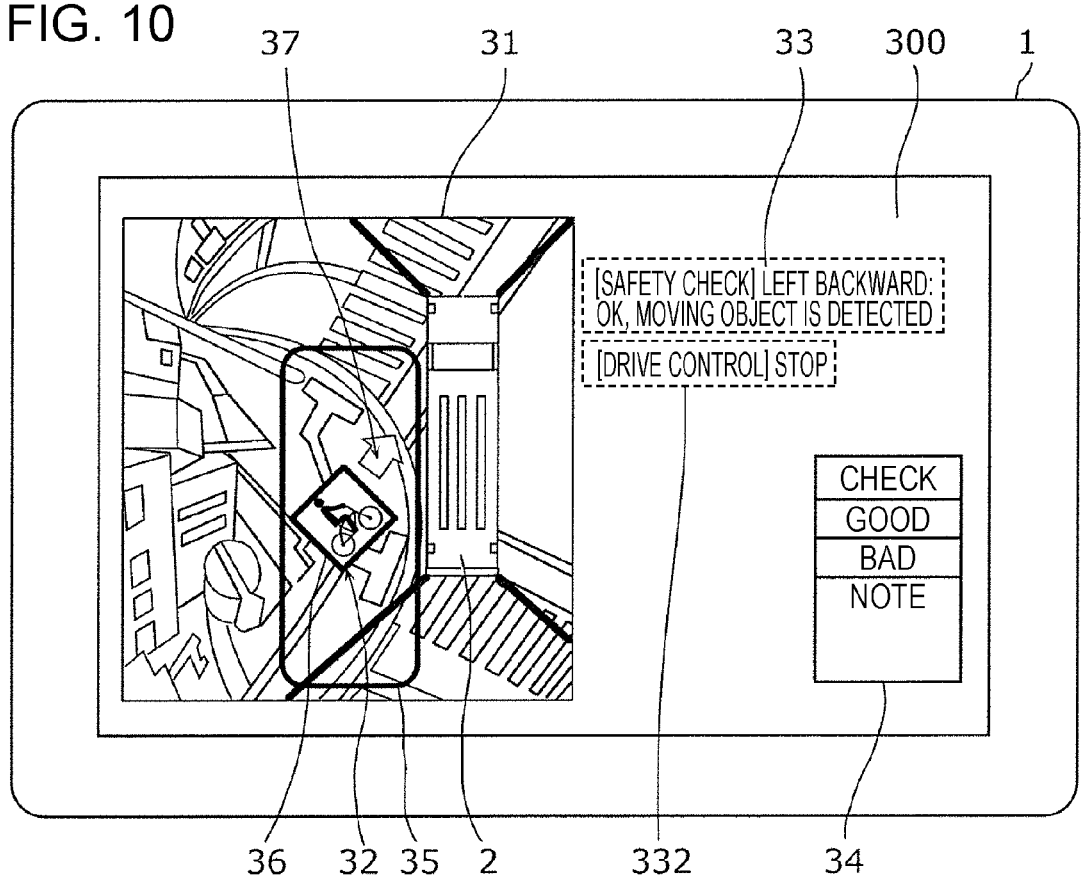
FIG. 10 is a diagram illustrating a third example of an image displayed in an information processing system according to an embodiment.

FIG. 10 is a diagram illustrating a third example of an image displayed on the terminal 1 according to an embodiment. An image 300 is an example of display information.

The image 300 shown in FIG. 10 further includes, in addition to the image 3 shown in FIG. 9A, a check area 35, highlighting information 36, running direction information 37, and a driving control image 332. The driving control image 332 is an example of an image indicating that the autonomous vehicle 2 has changed the driving control from a predetermined content of driving control.

The check area 35 is an image indicating an area on the captured image 31 corresponding to the safety check direction, and the check area 35 is superimposed on the captured image 31. This makes it possible for the user U to easily get to know in which direction and in which area the object recognition process is performed by the autonomous vehicle 2.

The highlighting information 36 is an image superimposed on the captured image 31 to make it possible for the location of the object 32 in the captured image 31 to be found more easily. In the specific example shown in FIG. 10, an image surrounding the object 32 in the captured image 31 is displayed as the highlighting information 36. This makes it possible for the user U to more easily get to know whether the captured image 31 includes the object 32 or not.

Figure 11A:
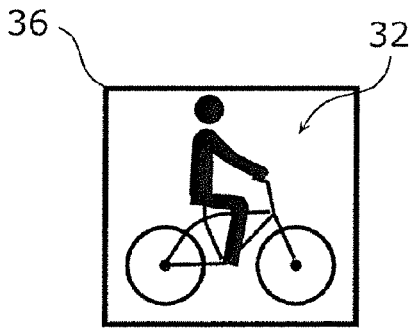
FIG. 11A is a diagram illustrating a first example of an image in which an obstacle displayed in an information processing system is highlighted according to an embodiment.
Figure 11B:
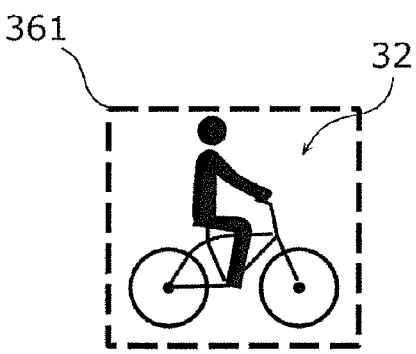
FIG. 11B is a diagram illustrating a second example of an image in which an obstacle displayed in an information processing system is highlighted according to an embodiment.

FIG. 11A is a diagram illustrating a first example of highlighting information 36 of the object 32 displayed on the terminal 1 according to an embodiment. FIG. 11B is a diagram illustrating a second example of highlighting information 361 of the object 32 displayed on the terminal 1 according to an embodiment.

The highlighting information is displayed in different modes depending on whether the object 32 influences the driving control of the autonomous vehicle 2. For example, in the first example of the highlighting information 36 shown in FIG. 11A, the highlighting information 36 is applied to a case where the object 32 is moving. In the second example of the highlighting information 361 shown in FIG. 11B, the highlighting information 361 is applied to a case where the object 32 is not moving.

In the autonomous driving, there is a possibility that the content of the driving control is changed or is not changed, for example, depending on whether the object 32 is moving toward the autonomous vehicle 2 or the object 32 is at rest. In view of the above, the display mode of the highlighting information is changed (for example, between the highlighting information 36 and the highlighting information 361) depending on whether the object 32 is a specific object (as in the case shown in FIG. 11A) and thus the driving control is changed or the object 32 is not a specific object and thus the driving control is not changed (for example, as in the case shown in FIG. 11B) such that the user U can easily get to know at a glance whether the object 32 is a specific object or not.

In the example shown in FIG. 11A, the highlighting information 36 is realized using a solid line, while in the example shown in FIG. 11B, the highlighting information 361 is realized using a broken line. However, the display modes of the highlighting information are not limited to those examples as long as the user U can recognize the difference in the display modes, that is, as long as the user U can recognize the difference between the highlighting information 36 and the highlighting information 361. For example, the highlighting information 36 and the highlighting information 361 may be displayed in different colors.

For example, in a case where the object 32 is moving, a direction in which the object 32 is moving may be indicated, for example, by an arrow as in FIG. 10 in which the direction is indicated by moving direction information 37.

The terminal 1 may display driving information indicating a content of the driving control of the autonomous vehicle 2 as shown by way of example in FIG. 10 in which a driving control image 332 is displayed as driving information. For example, a content of driving control (for example, a left turn) that is to be performed by the autonomous vehicle 2 at a particular event is prespecified depending on the particular event. However, in a case where the autonomous vehicle 2 judges that the object 32 is a specific object, there is a possibility that the content of the driving control is changed by the autonomous vehicle 2. More specifically, for example, in such a situation, the autonomous vehicle 2 may stop. To handle such a situation, the terminal 1 may acquire driving information indicating the content of the driving control performed by the autonomous vehicle 2 and may judge whether the acquired driving information is coincident with the content of the driving control specified to be executed at the particular event. A judgment result may be displayed, for example, as is displayed by the driving control image 332.

This makes it possible for the user U to more easily get to know the content of the driving control performed by the autonomous vehicle 2 and an occurrence of a change in the driving control.

Fourth Example

Figure 12:
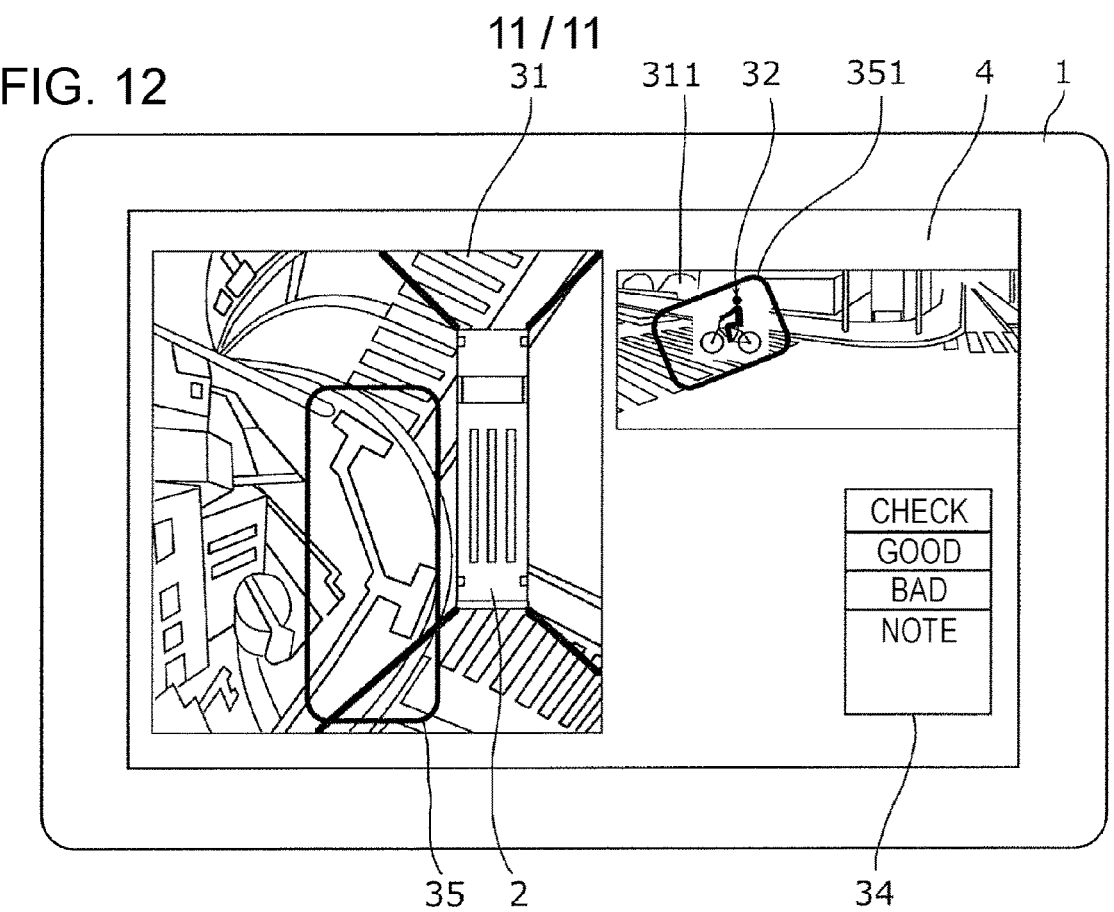
FIG. 12 is a diagram illustrating a fourth example of an image displayed in an information processing system according to an embodiment.

FIG. 12 is a diagram illustrating a fourth example of an image displayed on the terminal 1 according to an embodiment. An image 4 is an example of the display information. In FIG. 12, recognition result information may also be displayed as in the FIG. 9A in which the safety check image 33 is displayed, although recognition result information is not shown in FIG. 12.

The image 4 shown in FIG. 12 includes, in addition to information displayed in the image 3, a captured image 311 obtained by capturing an image in a direction (second direction) different from the safety check direction (first direction).

The captured image 311 is an image obtained, for example, by capturing an image in a direction (second direction) that is not included in the captured image 31 including the safety check direction (first direction). As described above, the terminal 1 acquires, from the autonomous vehicle 2, not only an image captured in the safety check direction but also an image taken in the second direction which is low in priority than the safety check direction. That is, the autonomous vehicle 2 transmits, to the terminal 1, the captured image information including the image captured in the safety check direction and the image captured in the second direction and the recognition result information. The terminal 1 judges, using the recognition result information acquired from the autonomous vehicle 2, whether a specific object is recognized in the second direction by the autonomous vehicle 2. In a case where it is judged that a specific object is recognized in the second direction, the terminal 1 further judges whether the driving control is changed by the autonomous vehicle 2. In a case where the driving control is changed, the terminal 1 displays display information including the captured image information including the second direction and information indicating that the specific object in the second direction is recognized, for example, as is displayed by the image 4 in FIG. 12. Note that a change in the driving control may be judged from information indicating the content of the driving control acquired from the autonomous vehicle 2, or from captured image information or location information or the like acquired from the autonomous vehicle 2.

As described above, in a case where the driving control is changed because of existence of a specific object detected in a direction different from the safety check direction, the terminal 1 may display an image in this direction different from the safety check direction. For example, in a case where the particular event is a left turn, the terminal 1 displays an image in a leftward direction as seen from the autonomous vehicle 2. Furthermore, in a case where recognition result information acquired by the terminal 1 indicates that a specific object is recognized in a rightward direction by the autonomous vehicle 2, if it is judged that a change has occurred in driving control of the autonomous vehicle 2, the terminal 1 also displays an image captured in the rightward direction as seen from the autonomous vehicle 2. This makes it possible for the user U to more properly get to know whether the recognition process for the autonomous driving is properly performed by the autonomous vehicle 2 also in a direction different from the safety check direction. Furthermore, the user U is allowed to get to know a reason why a driving control different from the driving control specified for the particular event is performed.

A check area 351, like the check area 35, is an image of an area on the captured image 311 corresponding to the second direction, and may be superimposed on the captured image 311. When a specific object is recognized in the second direction, the image in the second direction may be displayed regardless of whether a change in the driving control occurs or not.

Fifth Example

Figure 13:
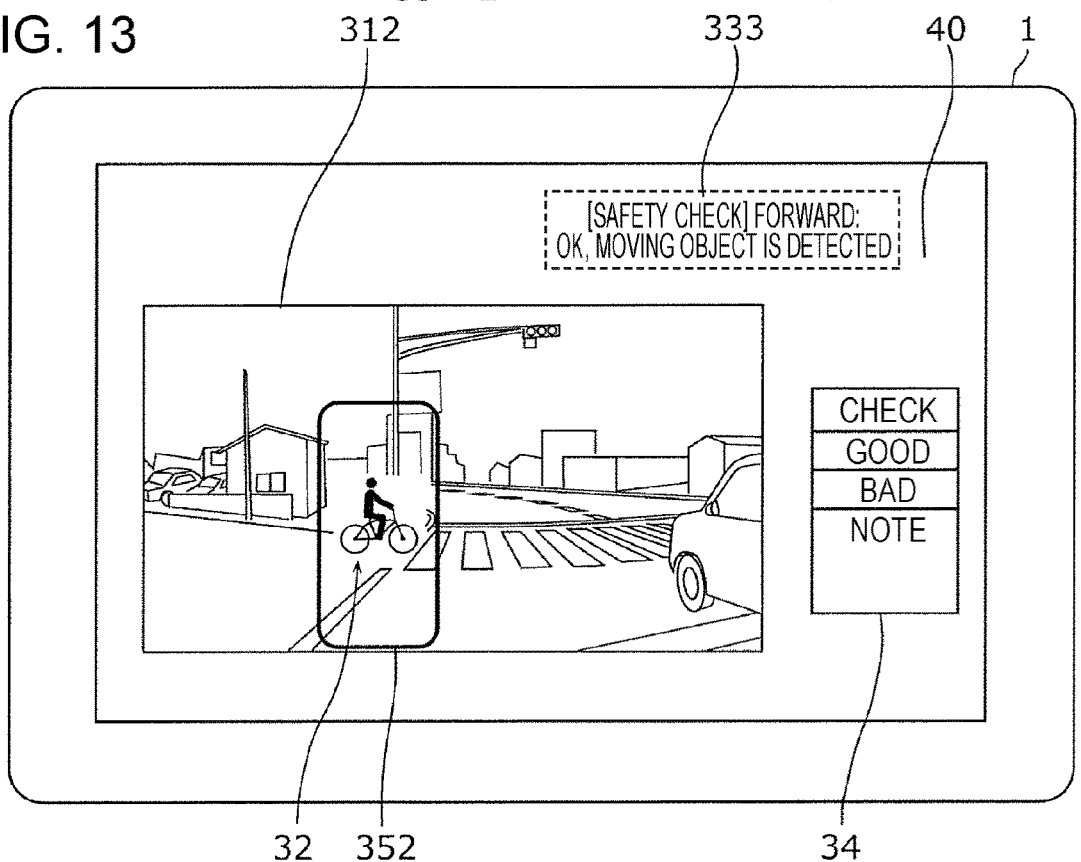
FIG. 13 is a diagram illustrating a fifth example of an image displayed in an information processing system according to an embodiment.

FIG. 13 is a diagram illustrating a fifth example of an image displayed on the terminal 1 according to an embodiment. An image 40 is an example of display information.

In examples described above with reference to FIG. 9A to FIG. 12, an image as seen in all directions around the autonomous vehicle 2 is generated from images captured by a plurality of image capture units 22 and the resultant image is displayed on the terminal 1. Alternatively, the terminal 1 may display only an image captured in the safety check direction like a captured image 312. For example, in a case where the terminal 1 receives, from the autonomous vehicle 2, an image viewed in all directions around the autonomous vehicle 2, the terminal 1 may select an area of the image including the safety check direction based on the recognition result information, and may display the selected area of image. More specifically, for example, the terminal 1 may display the image acquired from the autonomous vehicle 2 in a mode corresponding to the particular event. For example, in a case where the event type of an event that has occurred is a left turn, the terminal 1 displays the captured image viewed in all direction around the autonomous vehicle 2. In a case where the event type of an event that has occurred is entering intersection, the terminal 1 displays a captured image in the forward direction as seen from the autonomous vehicle 2.

This makes it possible for the user U to more easily get to know whether the recognition process in the safety check direction is properly performed by the autonomous vehicle 2.

A check area 352 is, like the check area 35 shown in FIG. 10, an image representing an area on the captured image 312 corresponding to the safety check direction and the check area 352 may be superimposed on the captured image 312.

In a case where an image such as the captured image 312 is displayed on the terminal 1, it is difficult for the user U to get information in a depth direction in the captured image 312. That is, although the user U can get to know, from the captured image 312, whether there is an object 32 or not, the distance to the object 32 from the autonomous vehicle 2 is estimated based on the size of the object 32, and thus it is difficult to accurately estimate the distance. To handle the above situation, the terminal 1 may change the mode in which the check area 352 is displayed, depending on the distance between the autonomous vehicle 2 and the object 32. For example, in a case where the distance to the object 32 from the autonomous vehicle 2 is equal to or greater than a predetermined particular value, the terminal 1 displays the check area 352 in black. However, in a case where the distance to the object 32 from the autonomous vehicle 2 is smaller than the predetermined particular value, the terminal 1 displays the check area 352 in red. In a case where the distance to the object 32 from the autonomous vehicle 2 is smaller than a predetermined particular value, the terminal 1 may change the mode in which the object 32 is displayed, for example, such that the object 32 in the captured image 312 is blinked.

The method described above makes it possible for the user U to easily get to know how far the object 32 is located from the autonomous vehicle 2. Thus, it becomes possible for the user U to get to know whether the driving control of the autonomous vehicle 2 is properly performed or not.

Furthermore, for example, as with the safety check image 33 shown in FIG. 9A, the terminal 1 displays an image including a judgment result as to whether existence of a specific object is detected from a recognition result information acquired from the autonomous vehicle 2 as is represented by way of example by a safety check image 333 indicating "FORWARD: OK, MOVING OBJECT IS DETECTED".

Other Embodiments

The information processing method and the information processing system have been described above with reference to one or more embodiments of the present disclosure. However, the present disclosure is not limited to those embodiments. It will be apparent to those skilled in the art that many various modifications may be applicable to the embodiments without departing from the spirit and scope of the present disclosure. Furthermore, constituent elements of different embodiments may be combined. In this case, any resultant combination also falls within the scope of the present disclosure.

In the embodiments described above, the evaluation of the result of the recognition performed by the autonomous vehicle 2 and the evaluation of the driving control based on the recognition result are performed, by way of example, by the user U. However, the evaluations may be performed by the terminal 1. For example, in a case where it is judged that recognition result information acquired from the autonomous vehicle 2 includes a result of object recognition in a safety check direction, the terminal 1 may add an evaluation point to a score. After the driving is completed, the terminal 1 may employ the final score as the evaluation value. In a case where it is judged that recognition result information acquired from the autonomous vehicle 2 does not include a result of object recognition in a safety check direction, the terminal 1 may reduce a point from the score. In such a manner, it is possible to automatically evaluate the driving of the autonomous vehicle 2.

In each embodiment described above, part or all of constituent element such as the terminal 1 may be realized using dedicated hardware or may be realized by executing software program corresponding to the constituent element. Each constituent element may be realized by a program execution unit such as a CPU, a processor or the like by reading software program stored in a storage medium such an HDD, a semiconductor memory, or the like and executing the software program. The software that realizes the information processing system or the like according to any embodiment may be a program described below.

The program causes a computer to execute a process including acquires event-related information 152 for detecting a particular event associated with the autonomous vehicle 2, judging, based on the acquired event-related information 152, whether the particular event is detected, in a case where it is judged that the particular event is detected, acquiring direction information indicating a first direction associated with the particular event, acquiring first recognition result information obtained as a result of a recognition process performed by the autonomous vehicle 2 as to an object located outside the autonomous vehicle 2, judging whether the first recognition result information includes a result of object recognition in the first direction, judging, using the first recognition result information, whether there exists in the first direction a specific object having a possibility of influencing the driving of the autonomous vehicle 2, in a case where it is judged that the specific object does not exist in the first direction and it is also judged that the first recognition result information includes the result of object recognition in the first direction, generating process completion information indicating that the autonomous vehicle 2 has performed the recognition process in the first direction, and outputting the generated process completion information.

Constituent elements such as the terminal 1 and the like may be implemented using one or a plurality of electronic circuits. The one or the plurality of electronic circuit each may be a general-purpose circuit or a dedicated circuit.

The one or the plurality of electronic circuits may include, for example, a semiconductor device, an IC (Integrated Circuit), or an LSI (Large Scale Integration). The IC or the LSI may be integrated on a single chip or may be realized by a combination of a plurality of chips. The integrated circuits called the IC or the LSI herein may be called differently depending on the integration density, and integrated circuits called a system LSI, a VLSI (Very Large Scale Integration), or a ULSI (Ultra Large Scale Integration) may also be used in the present disclosure. Furthermore, an FPGA (Field Programmable Gate Array) capable of being programmed after the LSI is produced, thereby properly may also be used for the same purpose.

General or specific embodiments may be implemented as a system, an apparatus, a method, an integrated circuit, or a computer program, or general or specific embodiments may be implemented by a computer-readable non-transitory storage medium such as an optical disk, an HDD, a semiconductor memory, or the like in which the computer program is stored. General or specific embodiments may be implemented by any selective combination of a system, an apparatus, a method, an integrated circuit, a computer program, and a storage medium.

It will be apparent to those skilled in the art that many various modifications may be applicable to the embodiments without departing from the spirit and scope of the present disclosure. Furthermore, constituent elements or functional elements of different embodiments may be combined. In this case, any resultant combination also falls within the scope of the present disclosure.

The information processing system and the information processing system disclosed herein are applicable to an apparatus or a system that properly presents, to a user, information indicating whether autonomous driving of a vehicle is properly performed or not.

What is claimed is:

1. An information processing method comprising:
   acquiring event-related information to detect a particular event associated with a vehicle;
   determining, using the event-related information, whether the particular event is detected or not;
   acquiring direction information indicating a first direction associated with the particular event in a case where it is determined that the particular event is detected;
   acquiring captured image information including a first image generated by capturing an image in the first direction and a second image generated by capturing an image in a second direction that is different from the first direction and has lower priority than priority of the first direction;
   acquiring first recognition result information obtained as a result of a recognition process performed by the vehicle as to an object located outside the vehicle based on the acquired captured image information;
   determining whether the first recognition result information includes a result of object recognition in the first direction;
   determining, using the first recognition result information, whether there exists in the first direction a specific object that may influence driving of the vehicle;
   generating process completion information indicating that the vehicle has performed the recognition process in the first direction, in response to (i) determining that the first recognition result information includes the result of object recognition in the first direction and (ii) determining that the specific object does not exist in the first direction;
   outputting the generated process completion information;
   displaying the first image, indicating the result of object recognition in the first direction, in a first window when the generated process completion information indicating that the vehicle has performed the recognition process in the first direction is output;
   determining, using the first recognition result information, whether a specific object exists in the second direction that is different from the first direction and has the lower priority than the priority of the first direction;
   in response to determining that the specific object exists in the second direction, further determining whether or not the vehicle has changed a predetermined autonomous driving control specified by the particular event because of the specific object existing in the second direction; and
   in response to determining that the specific object exists in the second direction and the vehicle has changed the predetermined autonomous driving control because of the specific object existing in the second direction, displaying the second image in the second direction in a second window separate from the first window, together with the first image in the first window, the second image including the specific object existing in the second direction.

2. The information processing method according to claim 1, further comprising:
   generating the process completion information including first information indicating that the specific object is recognized in the first direction in a case where it is determined that the specific object exists in the first direction, and
   generating the process completion information including second information indicating that the specific object is not recognized in the first direction in a case where it is determined that the specific object does not exist in the first direction.

3. The information processing method according to claim 1, wherein the first recognition result information is information acquired by performing the recognition process on an image obtained by capturing an image in a particular range in the first direction from the vehicle.

4. The information processing method according to claim 3, further comprising
   acquiring driving information on the vehicle including at least one of a steering angle of the vehicle and a vehicle speed,
   wherein the particular range is determined depending on the driving information on the vehicle.

5. The information processing method according to claim 4, further comprising outputting the acquired driving information on the vehicle together with the process completion information.

6. The information processing method according to claim 1, wherein the process completion information is further output repeatedly until the detected particular event is no longer detected or until a predetermined time has elapsed in a case where the particular event is detected.

7. The information processing method according to claim 2, further comprising
   determining whether the vehicle has made a decision to perform a driving control or has changed the driving control because of the existence of the specific object in the first direction in a case where it is determined that the specific object exists in the first direction, and
   generating the first information including a result of the determination as to whether the vehicle has made the decision to perform the driving control or has changed the driving control because of the specific object existing in the first direction.

8. The information processing method according to claim 1, further comprising
   outputting the acquired first image together with the process completion information in a mode depending on the detected particular event.

9. The information processing method according to claim 1, further comprising
   generating non-execution information indicating that the recognition process in the first direction has not been performed by the vehicle and outputting the generated non-execution information in a case where it is determined that the first recognition result information does not include the result of object recognition in the first direction.

10. A non-transitory recording medium storing thereon a computer program, which when executed by a processor, causes the processor to perform operations according to claim 1.

11. The information processing method according to claim 1, wherein the particular event includes at least one of starting, stopping, right turning, left turning, entering an intersection, starting driving backward or changing a lane.

12. The information processing method according to claim 1, wherein the result of object recognition in the first direction includes at least one of information indicating that the recognition process has been performed in the first direction, information indicating that the recognition process was successful in the first direction, or information indicating that there is a recognized object in the first direction.

13. The information processing method according to claim 1, further comprising:
   generating a check box to prompt a user to input an evaluation result as to whether the recognition process is properly performed by the vehicle;
   displaying the generated process completion information together with the generated check box; and
   receiving, from the user, an input of the evaluation result via an operation on the displayed check box.

14. The information processing method according to claim 1, wherein
   the first image in the first direction is displayed in the first window regardless of whether the specific object is recognized in the first direction, and
   the second image in the second direction is not displayed when the specific object is not recognized in the second direction or when the predetermined autonomous driving control has not been changed because of the recognized specific object in the second direction.

15. The information processing method according to claim 2, wherein
   when the process completion information including first information indicating that the specific object is recognized in the first direction is generated, the first image in the first direction includes the recognized specific object in the first direction, and
   when the process completion information including second information indicating that the specific object is not recognized in the first direction is generated, the first image in the first direction does not include any specific object.

16. The information processing method according to claim 1, wherein
   the first image in the first direction is displayed as a bird's-eye view image, when the detected particular event is a first event,
   the first image in the first direction is displayed as a forward direction image, when the detected particular event is a second event different from the first event.

17. A system comprising:
   a processor; and
   a non-transitory recording medium storing a computer program, which when executed by the processor, causes the processor to perform operations including:
   acquiring event-related information for detecting a particular event associated with a vehicle;
   determining, using the event-related information, whether the particular event is detected;
   acquiring direction information indicating a first direction associated with the particular event in a case where it is determined that the particular event is detected;
   acquiring captured image information including a first image generated by capturing an image in the first direction and a second image generated by capturing an image in a second direction that is different from the first direction and has lower priority than priority of the first direction;
   acquiring first recognition result information obtained as a result of a recognition process performed by the vehicle as to an object located outside the vehicle based on the acquired captured image information;
   determining whether the first recognition result information includes a result of object recognition in the first direction;
   determining, using the first recognition result information, whether there exists in the first direction a specific object that may influence the driving of the vehicle;
   generating process completion information indicating that the vehicle has performed the recognition process in the first direction, in response to (i) determining that the first recognition result information includes the result of object recognition in the first direction and (ii) determining that the specific object does not exist;
   displaying the generated process completion information on a display apparatus;
   displaying the first image, indicating the result of object recognition in the first direction, in a first window when the generated process completion information indicating that the vehicle has performed the recognition process in the first direction is displayed;
   determining, using the first recognition result information, whether a specific object exists in the second direction different from the first direction;
   in response to determining that the specific object exists in the second direction, further determining whether or not the vehicle has changed a predetermined autonomous driving control specified by the particular event because of the specific object existing in the second direction; and
   in response to determining that the specific object exists in the second direction and the vehicle has changed the predetermined autonomous driving control because of the specific object existing in the second direction, displaying the second image in the second direction in a second window separate from the first window, together with the first image in the first direction in the first window, the second image including the specific object existing in the second direction on the display apparatus.

18. The system according to claim 17, further comprising:
   generating a check box to prompt a user to input an evaluation result as to whether the recognition process is properly performed by the vehicle;
   displaying the generated process completion information together with the generated check box on a display apparatus; and
   receiving, from the user, an input of the evaluation result via an operation on the displayed check box.

19. The system according to claim 17, wherein
   the first image in the first direction is displayed in the first window regardless of whether the specific object is recognized in the first direction, and
   the second image in the second direction is not displayed when the specific object is not recognized in the second direction or when the predetermined autonomous driving control has not been changed because of the recognized specific object in the second direction.

* * * * *